United States Patent
Takamatsu et al.

(10) Patent No.: US 9,178,449 B2
(45) Date of Patent: Nov. 3, 2015

(54) MOTOR DRIVE SYSTEM CONTROL APPARATUS

(75) Inventors: Naoyoshi Takamatsu, Sunto-gun (JP); Masaki Okamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 174 days.

(21) Appl. No.: 13/579,143

(22) PCT Filed: Jan. 11, 2011

(86) PCT No.: PCT/JP2011/050284
§ 371 (c)(1),
(2), (4) Date: Aug. 15, 2012

(87) PCT Pub. No.: WO2012/095946
PCT Pub. Date: Jul. 19, 2012

(65) Prior Publication Data
US 2014/0001990 A1    Jan. 2, 2014

(51) Int. Cl.
*H02H 7/09* (2006.01)
*H02H 7/08* (2006.01)
*H02P 6/00* (2006.01)
(Continued)

(52) U.S. Cl.
CPC .............. *H02P 6/001* (2013.01); *B60L 11/005* (2013.01); *B60L 11/14* (2013.01); *B60L 11/16* (2013.01); *B60L 11/1868* (2013.01); *B60L 15/20* (2013.01); *H02P 21/0092* (2013.01);
(Continued)

(58) Field of Classification Search
CPC ............. H02P 6/002; H02P 6/14; H02P 6/16; H02H 7/0833
USPC ............................ 318/400.22, 400.21, 400.01
See application file for complete search history.

(56) References Cited

U.S. PATENT DOCUMENTS 5,736,825 A *  4/1998  Kaura et al. ................. 318/599
6,313,602 B1  11/2001  Arefeen et al.
(Continued)

FOREIGN PATENT DOCUMENTS

CN   101331677 A   12/2008
DE   19748479 C1   4/1999
(Continued)

OTHER PUBLICATIONS

International Search Report issued in International Patent Application No. PCT/JP2011/050284 dated Apr. 12, 2011.

*Primary Examiner* — Eduardo Colon Santana
*Assistant Examiner* — Gabriel Agared
(74) *Attorney, Agent, or Firm* — Oliff PLC

(57) ABSTRACT

A motor drive system control apparatus includes: a direct current power supply; a three-phase alternating current motor; a first power converter including switching circuits corresponding to each of three phases of the three-phase alternating current motor and a smoothing condenser disposed electrically in parallel with the switching circuits; an estimating device for estimating peak generation timing in which a peak is generated in an inter-terminal voltage VH of the smoothing condenser on the basis of at least one of an operating condition of the three-phase alternating current motor; a switching condition of the switching circuits corresponding to each of the three phases; and a controlling device for controlling a drive condition of the first power converter so the inter-terminal voltage VH (or a VH peak) in the peak generation timing decreases, for a predetermined period from start timing set in a time domain before the estimated peak generation timing.

7 Claims, 20 Drawing Sheets

(51) Int. Cl.
  *B60L 11/00* (2006.01)
  *B60L 11/14* (2006.01)
  *B60L 11/16* (2006.01)
  *B60L 11/18* (2006.01)
  *B60L 15/20* (2006.01)
  *H02P 23/14* (2006.01)
  *H02P 27/08* (2006.01)
  *H02P 21/00* (2006.01)

(52) U.S. Cl.
  CPC .............. *H02P 23/14* (2013.01); *H02P 27/08* (2013.01); *B60L 2210/14* (2013.01); *B60L 2210/40* (2013.01); *B60L 2240/421* (2013.01); *B60L 2240/423* (2013.01); *H02P 2201/07* (2013.01); *H02P 2201/09* (2013.01); *Y02T 10/643* (2013.01); *Y02T 10/644* (2013.01); *Y02T 10/70* (2013.01); *Y02T 10/7005* (2013.01); *Y02T 10/7022* (2013.01); *Y02T 10/7066* (2013.01); *Y02T 10/7077* (2013.01); *Y02T 10/7225* (2013.01); *Y02T 10/7241* (2013.01); *Y02T 10/7275* (2013.01)

(56) References Cited

U.S. PATENT DOCUMENTS

| | | | |
|---|---|---|---|
| 2004/0207360 A1* | 10/2004 | Matsushiro et al. | 318/811 |
| 2009/0108794 A1* | 4/2009 | Ochiai et al. | 318/760 |
| 2010/0110743 A1* | 5/2010 | Yamasaki | 363/132 |
| 2010/0295494 A1 | 11/2010 | Takeuchi et al. | |
| 2011/0061411 A1* | 3/2011 | Kim et al. | 62/132 |
| 2011/0140642 A1* | 6/2011 | Kono et al. | 318/139 |
| 2011/0313608 A1* | 12/2011 | Izumi et al. | 701/22 |

FOREIGN PATENT DOCUMENTS

| | | |
|---|---|---|
| EP | 1027767 A1 | 8/2000 |
| JP | A-2000-324842 | 11/2000 |
| JP | A-2003-289671 | 10/2003 |
| JP | A-2006-121877 | 5/2006 |
| JP | A-2007-166875 | 6/2007 |
| JP | A-2010-119201 | 5/2010 |

* cited by examiner (a) State A, State C (b) State B

MOTOR DRIVE SYSTEM CONTROL APPARATUS

TECHNICAL FIELD

The present invention relates to a motor drive system control apparatus which controls a motor drive system for driving a three-phase alternating current motor.

BACKGROUND ART

In this type of technical field, there is a technology about pulse width modulation (PWM) control of an inverter (e.g. refer to a patent document 1). According to an apparatus disclosed in the patent document 1, by correcting a PWM signal with a correction signal generator for outputting a correction signal having a symmetric waveform to that of an alternating current output, a waveform of a three-phase alternating current output supplied to a load is corrected in a positively and negatively symmetrical manner, and waveform distortion due to a harmonic can be suppressed.

Incidentally, there is also suggested an apparatus for reducing direct current ripple superimposed on a direct current output voltage (e.g. refer to a patent document 2).

PRIOR ART DOCUMENT

Patent Document
Patent document 1: Japanese Patent Application Laid Open No. 2000-324842
Patent document 2: Japanese Patent Application Laid Open No. 2003-289671

DISCLOSURE OF INVENTION

Subject to be Solved by the Invention

The inverter is normally provided with a smoothing condenser for smoothing a voltage. With a change in switching state of the inverter in a high frequency region, the smoothing condenser is subject to voltage variation referred to so-called switching ripple.

Since this type of switching ripple occurs on the order of a carrier frequency (several hundred Hz to several dozen kHz) of the inverter, it is hardly possible in practice to take a measure of feedback (hereinafter abbreviated as "F/B" as occasion demands).

In the apparatuses disclosed in the patent documents described above, the measure for the switching ripple is not considered. Thus, in order to protect the inverter from this type of switching ripple, there is no choice but to depend on a method of increasing a withstand voltage or a capacity of the smoothing condenser or similar methods.

However, if this type of motor drive system is applied, for example, to drive an in-vehicle motor or the like which has steadily grown in recent years, it is hard to make the capacity of the smoothing condenser high enough to sufficiently reduce an influence of this type of switching ripple. Moreover, due to limitations of cost, it is also hard to increase the withstand voltage which is accompanied by a cost increase.

As described above, the conventional technology has such a technical problem that it is hard to suppress or reduce the occurrence of the switching ripple associated with the switching of the inverter and the generation of a peak voltage due to the switching ripple.

In view of the aforementioned problem, it is therefore an object of the present invention to provide a motor drive system control apparatus capable of suppressing the generation of a peak voltage in a smoothing condenser in a motor drive system for driving a three-phase alternating current motor.

DISCLOSURE OF INVENTION

Subject to be Solved by the Invention

The above object of the present invention can be achieved by a motor drive system control apparatus for controlling a motor drive system provided with: a direct current power supply; a three-phase alternating current motor; and a first power converter disposed between the direct current power supply and the three-phase alternating current motor and including switching circuits corresponding to each of three phases of the three-phase alternating current motor and a smoothing condenser disposed electrically in parallel with the switching circuits, the motor drive system control apparatus provided with: an estimating device for estimating peak generation timing in which a peak is generated in an inter-terminal voltage VH of the smoothing condenser on the basis of at least one of an operating condition of the three-phase alternating current motor including at least one of an electric current corresponding to each of the three phases and a phase of the three-phase alternating current motor and a switching condition of the switching circuits corresponding to each of the three phases; and a controlling device for controlling a drive condition of the first power converter such that the inter-terminal voltage VH (or a VH peak) in the peak generation timing decreases, for a predetermined period from start timing set in a time domain before the estimated peak generation timing (claim 1).

According to the motor drive system control apparatus of the present invention, the generation timing of the peak of the inter-terminal voltage VH of the smoothing condenser, which is generated by switching ripple caused by a change in a switching state of the switching circuits corresponding to each of the three phases in the first power converter, is estimated by the estimating device.

Here, the "operating condition of the three-phase alternating current motor" referred to by the estimating device when estimating the peak generation timing means an electric current corresponding to each of the three phases (e.g. each of three-phase currents Iu, Iv, and Iw corresponding to a U-phase, a V-phase, and a W-phase, respectively), a motor rotational phase θ, or the like. Moreover, the "switching condition of the switching circuits" includes a condition for defining switching timing of the switching circuits corresponding to each of the three phases and means, for example, a magnitude relation between a carrier signal voltage and a command voltage corresponding to each of the three phases, or the like.

On the other hand, if the peak generation timing is estimated by the estimating device, a VH peak reduction measure indicating directly or indirectly controlling the drive condition of the first power converter is taken by the controlling device, with the time point, which is set in the time domain before the estimated peak generation timing, used as the start timing.

Thus, according to the present invention, it is possible to reduce the VH peak in comparison with a case where this type of measure is not taken, and it is possible to mitigate an influence of the switching ripple in the first power converter by using a control method which is not accompanied by an increase in the withstand voltage or the capacity of the smoothing condenser.

Incidentally, the "drive condition of the first power converter" may be an arbitrary condition if it can cause the reduction in the VH peak; however, preferably, it is broadly divided into a condition which influences the switching state of the switching circuits corresponding to each of the three phases and a condition which influences the inter-terminal voltage VH of the smoothing condenser. The former can include, for example, the carrier signal voltage, the command voltage corresponding to each of the three phases, and the like. The latter can include a command value of the inter-terminal voltage VH (a VH command value), a power generation state of another power converter disposed in parallel with the first power converter, and the like.

Incidentally, regarding a period in which the controlling device takes this type of VH peak reduction measure, there is no particular limitation at least as long as the start timing thereof is defined as described above; however, from the viewpoint of the expressed intent, it is obviously sufficiently shorter than a carrier period defined by the carrier frequency. Moreover, obviously, it is a period short enough not to interfere with the drive of the three-phase alternating current motor.

In one aspect of the motor drive system control apparatus of the present invention, the estimating device estimates the peak generation timing on the basis of polarity of an electric current corresponding to each of the three phases and switching timing of the switching circuits corresponding to each of the three phases (claim 2).

The applicant of the this application has found that a relation between the polarity of the electric current corresponding to each of the three phases and the switching timing of the switching circuits corresponding to each of the three phases is related to the generation timing of the peak on a high voltage side (i.e. the peak of a waveform) on which great importance is to be placed from the viewpoint of protecting the smoothing condenser. According to this aspect, the peak generation timing can be estimated, highly accurately, before the peak generation timing actually comes, which is extremely useful in practice.

Incidentally, in this aspect, the switching timing may be timing in which a carrier voltage value matches a command voltage value, and the estimating device may estimate (1) first timing in which the electric current is positive and in which the carrier voltage value matches the command voltage value when the command voltage value goes beyond the carrier voltage value and (2) second timing in which the electric current is negative and in which the carrier voltage value matches the command voltage value when the command voltage value falls under the carrier voltage value, as the peak generation timing for each of the three phases (claim 3).

According to such an estimation method, the peak generation timing on the high voltage side can be estimated, highly accurately.

In another aspect of the motor drive system control apparatus of the present invention, the estimating device estimates the peak generation timing on the basis of a phase of the three-phase alternating current motor (claim 4).

According to the applicant of this application, it has been found that there is a correlation between the phase of the three-phase alternating current motor and a magnitude relation of the VH peak of the smoothing condenser. Therefore, it is possible to know the motor phase in which the VH peak is greater than a predetermined value, experimentally, experientially, or theoretically in advance.

By knowing such a motor phase, it is possible to take the VH peak reduction measure only in the case where the VH peak is greater than the predetermined value or preferentially in such a case, resulting in efficient protection of the smoothing condenser due to leveling of the VH peak.

In another aspect of the motor drive system control apparatus of the present invention, the motor drive system comprises a second power converter, and the controlling device changes a drive condition of the second power converter as one aspect of controlling the drive condition of the first power converter (claim 5).

If the second power converter as described above is provided, the drive condition of the first power converter can be indirectly changed by changing the drive condition of the second power converter, and thus, the smoothing condenser can be protected, more flexibly.

Incidentally, in this aspect, the second power converter may be disposed on a side closer to the direct current power supply than the smoothing condenser and may include a booster circuit capable of boosting a direct current voltage of the direct current power supply and capable of maintaining the inter terminal voltage VH at a predetermined VH command value, and the controlling device may reduce the VH command value (claim 6).

In particular, in a configuration in which the motor can be driven in a high voltage region greater than or equal to a supply voltage of the direct current power supply by this type of booster circuit, the motor drive system can be easily established depending on the application of the motor, and, for example, it can be simply applied to an in-vehicle motor drive system. Moreover, in a configuration in which the inter-terminal voltage VH can be maintained at the VH command value, the VH peak can be reduced, relatively easily, by temporarily reduction the VH command value.

In another aspect of the motor drive system control apparatus of the present invention, the switching circuits corresponding to each of the three phases are configured to change a switching state in accordance with a magnitude relation between a carrier voltage value and a command voltage value, and the controlling device reduces the VH peak by changing a frequency of a carrier signal to a high frequency side (claim 7).

When the frequency of the carrier signal (i.e. the carrier frequency) is changed to the higher frequency side with respect to a normally operated reference frequency, if the command voltage corresponding to each of the three phases is constant, obviously, a switching pulse width of the switching circuits corresponding to each of the three phases is shorten. Therefore, a charge-discharge state of the smoothing condenser is frequently changed, and a period in which the inter-terminal voltage VH of the smoothing condenser increases is kept short. Thus, the VH peak can be suppressed.

In another aspect of the motor drive system control apparatus of the present invention, the switching circuits corresponding to each of the three phases are configured to change a switching state in accordance with a magnitude relation between a carrier voltage value and a command voltage value, and the controlling device superimposes a predetermined harmonic on the command voltage value (claim 8).

If the harmonic is superimposed on the command voltage value corresponding to each of the three phases, the waveform of the command voltage is changed by the harmonic, and thus, the switching timing of the switching circuits corresponding to each of the three phases can be changed. Therefore, in a situation in which the peak generation timing of the smoothing condenser can be predicted, the VH peak can be changed by superimposing the harmonic on the command voltage in the peak generation timing.

Here, in particular, the control of the switching timing by the harmonic shifts the peak generation timing, as opposed to the setting of the higher carrier frequency described above, and on the face of it, it does not necessarily change the magnitude of the VH peak.

In view of this point, it is more preferable to obtain a relation between the motor phase and amplitude of the harmonic, experientially, experimentally, or theoretically, so as to avoid switching in the switching timing in which the VH peak relatively increases, in advance, by using the point that the motor phase can be related to the magnitude of the VH peak as described above. In this case, for example, by control-mapping and holding the relation in a proper storage device or by similar actions, it is possible to obtain a VH peak reduction effect produced by the superimposition of the harmonic, more effectively.

Moreover, in the system for driving the three-phase motor, if the frequency of the harmonic is selected to be three times a fundamental frequency of three-phase voltage command values Vu, Vv, and Vw, the harmonic does not appear in a voltage between motor lines, and it does not have an adverse effect on a motor current. In other words, a third harmonic of the fundamental frequency can be a preferable example of this type of harmonic.

The operation and other advantages of the present invention will become more apparent from embodiments explained below.

MODE FOR CARRYING OUT THE INVENTION

Embodiments of the Invention

Hereinafter, various preferred embodiments of the present invention will be explained with reference to the drawings.

First Embodiment

Configuration of Embodiment

Figure 1:
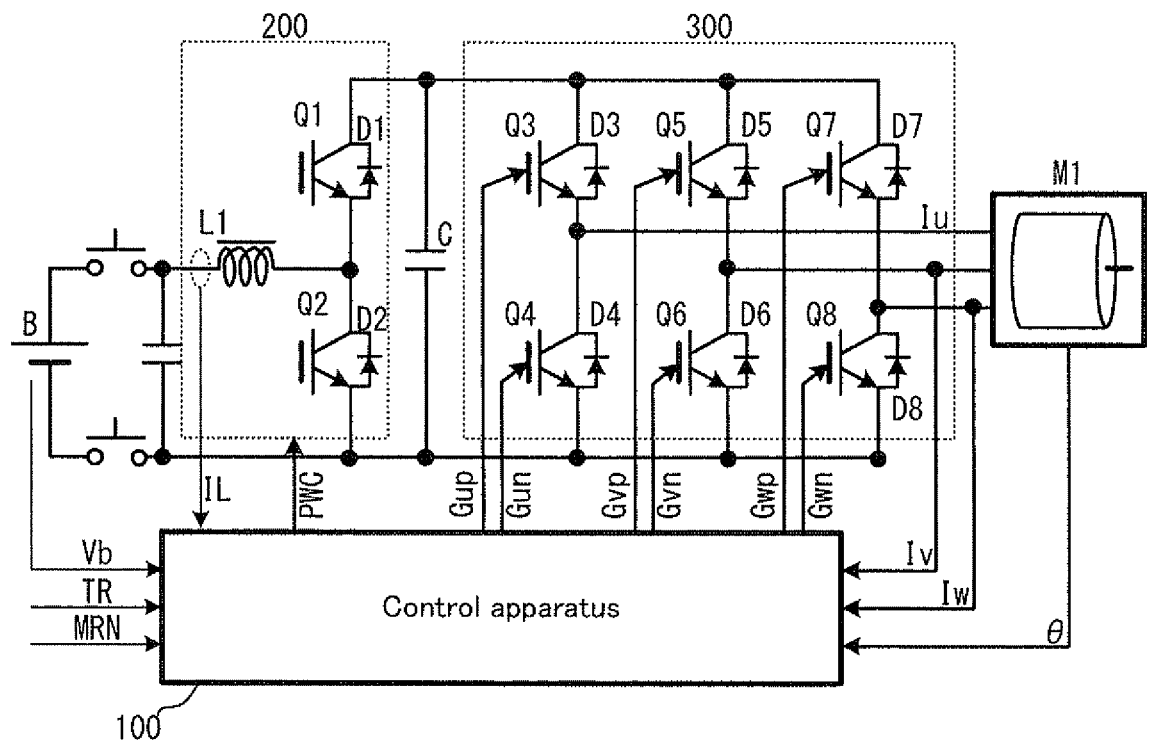
FIG. 1 is a system configuration diagram showing a motor drive system in a first embodiment of the present invention.

Firstly, with reference to FIG. 1, the configuration of a motor drive system 10 in the embodiment will be explained. FIG. 1 is a system configuration diagram showing the configuration of the motor drive system 10.

In FIG. 1, the motor drive system 10 is provided with a control apparatus 100, a boost converter 200, an inverter 300, a smoothing condenser C, a direct current (DC) power supply B, and a three-phase alternating current (AC) motor M1.

The control apparatus 100 is an electronic control unit as one example of the "motor drive system control apparatus" of the present invention, which is configured to control operations of the motor drive system 10.

The control apparatus 100 can adopt forms of, for example, various computer systems or the like, such as microcomputer apparatuses, various controllers, or various processing units like a single or a plurality of electronic control units (ECUs), which can include, as occasion demands, one or a plurality of central processing units (CPUs), micro processing units (MPUs), various processors or various controllers, or moreover, various storage devices or the like, such as a read only memory (ROM), a random access memory (RAM), a buffer memory or a flash memory.

The control apparatus 100 is provided with a boost converter control unit 110 and an inverter control unit 120 which are not illustrated in FIG. 1; however, the configuration of each control unit will be described later. Moreover, the control apparatus 100 can perform VH peak reduction control described later, in accordance with a control program stored in a ROM in advance.

The boost converter 200 is a booster circuit as one example of the "second power converter" of the present invention, which is provided with a reactor L1, switching elements Q1 and Q2, and diodes D1 and D2.

One end of the reactor L1 is connected to a positive line (whose reference numeral is omitted) connected to a positive electrode of the DC power supply B, and the other end is connected to a midpoint between the switching element Q1 and the switching element Q2, i.e. a connection point between an emitter terminal of the switching element Q1 and a collector terminal of the switching element Q2.

The switching elements Q1 and Q2 are connected in series between the positive line and a negative line connected to a negative electrode of the DC power supply B. Moreover, a collector terminal of the switching element Q1 is connected to the positive line, and an emitter element of the switching element Q2 is connected to the negative line. Each of the diodes D1 and D2 is a rectifier for allowing only an electric current from the emitter side to the collector side in respective one of the switching elements.

The switching elements Q1 and Q2 and each of switching elements (Q3 to Q8) of the inverter 300 described later are configured as insulated gate bipolar transistors (IGBTs), power metal oxide semiconductor (MOS) transistors, or the like.

The inverter 300 is one example of the "first power converter" of the present invention, which is provided with: a U-phase arm (whose reference numeral is omitted) including a p-side switching element Q3 and an n-side switching element Q4; a V-phase arm (whose reference numeral is omitted) including a p-side switching element Q5 and an n-side switching element Q6; and a W-phase arm (whose reference numeral is omitted) including a p-side switching element Q7 and an n-side switching element Q8. The arms of the inverter 300 are connected in parallel between the positive line and the negative line.

Incidentally, to the switching elements Q3 to Q8, as in the switching elements Q1 and Q2, rectifying diodes D3 to D8 for passing an electric current from the emitter side to the collector side are connected, respectively. Moreover, a midpoint between the p-side switching element and the n-side switching element in each of the three phase arms of the inverter 300 is connected to respective one of three phase coils of the three-phase AC motor M1.

The smoothing condenser C is a condenser for smoothing a voltage which is connected between the positive line and the negative line. An inter-terminal voltage of the smoothing condenser C, i.e. a voltage between the positive line and the negative line, will be hereinafter referred to as an "inter-terminal voltage VH", as occasion demands.

The DC power supply B is a chargeable electric storage apparatus, and it is, for example, various secondary batteries such as a nickel-metal hydride battery and a lithium ion battery. Incidentally, as the DC power supply B, in addition to or instead of this type of secondary battery, an electric double layer capacitor, a large-capacity condenser, a flywheel, and the like may be used.

The three-phase AC motor M1 is a three-phase AC motor generator in which a permanent magnet is buried in a rotor. The three-phase AC motor M1 is mechanically coupled with a not-illustrated driving wheel of a vehicle, and it is configured to generate torque for driving the vehicle. The three-phase AC motor M1 can also perform electric power regeneration (power generation) in response to an input of vehicular kinetic energy in braking of the vehicle. If the vehicle is a so-called hybrid vehicle, the three-phase AC motor M1 is mechanically coupled with a not-illustrated engine and it can both perform the electric power regeneration by using the power of the engine and assist the power of the engine.

The motor drive system 10 has a not-illustrated sensor group attached thereto, which detects a voltage Vb of the DC power supply B, an electric current IL flowing in the reactor L1 of the boost converter 200, the inter-terminal voltage VH of the smoothing condenser C, a v-phase current Iv and a w-phase current Iw of the inverter 300, a motor rotational phase θ as a rotation angle of the rotor of the three-phase AC motor M1, and the like, as occasion demands.

Each of sensors which constitute the sensor group is electrically connected to the control apparatus 100, and a detected value is understood by the control apparatus 100 in real time.

Moreover, in the motor drive system 10, the boost converter 200 and the inverter 300 are electrically connected to the control apparatus 100, and drive states thereof are controlled by the control apparatus 100.

Here, in particular, the boost converter 200 can boost the voltage between the positive line and the negative line, i.e. the inter-terminal voltage VH, to an output voltage of the DC power supply B or higher, on the basis of a signal PWC supplied from the control apparatus 100. At this time, if the inter-terminal voltage VH is less than a target voltage, an on-duty of the switching element Q2 is set to be relatively large, which makes it possible to increase the electric current flowing in the positive line from the DC power supply B side to the inverter 300 side and to increase the inter-terminal voltage VH. On the other hand, if the inter-terminal voltage VET is greater than the target voltage, an on-duty of the switching element Q1 is set to be relatively large, which makes it possible to increase the electric current flowing in the positive line from the inverter 300 side to the DC power supply B side and to reduce the inter-terminal voltage VH.

Figure 2:
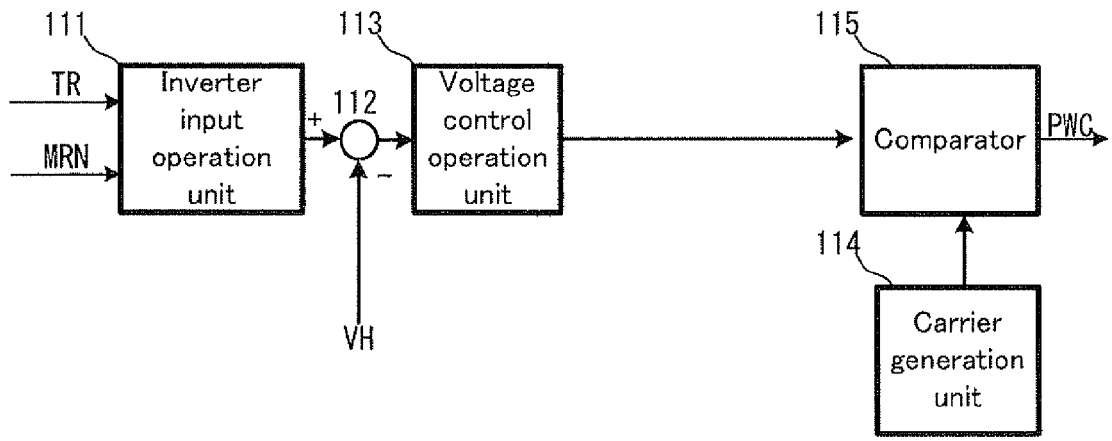
FIG. 2 is a block diagram showing a booster circuit control unit in a control apparatus for the motor drive system shown in FIG. 1.

Next, with reference to FIG. 2, an explanation will be given to the configuration of the boost converter control unit 110 for controlling the boost converter 200 on the control apparatus 100. FIG. 2 is a block diagram showing the boost converter control unit 110. Incidentally, in FIG. 2, portions overlapping those of FIG. 1 will carry the same reference numerals, and the explanation thereof will be omitted as occasion demands.

In FIG. 2, the boost converter control unit 110 is provided with an inverter input operation unit 111, an adder-subtractor 112, a voltage control operation unit 113, a carrier generator 114, and a comparator 115.

The inverter input operation unit 111 is a circuit for generating a VH command value VHtg indicating a target value of the inter-terminal voltage VH, which is an output voltage of the boost converter 200. For example, the inverter input operation unit 111 generates the VH command value VHtg on the basis of an output value of the three-phase AC motor M1 calculated from a motor rotational speed MRN and a torque command value TR of the three-phase AC motor M1.

The adder-subtractor 112 subtracts a detected value of the inter-terminal voltage VH from the VH command value VHtg and outputs a subtraction result to the voltage control operation unit 113. When receiving the subtraction result obtained by subtracting the detected value of the inter-terminal voltage VH from the VH command value VHtg, the voltage control operation part 113 calculates a controlled variable for matching the inter-terminal voltage VH with the VH command value VHtg. At this time, for example, a known PI control operation including a proportional term (P term) and an integral term (I term) or the like is used. The voltage control operation unit 113 outputs the calculated controlled variable to the comparator 115 as a voltage command value.

The carrier generation unit 114 generates a carrier signal, which is a triangular wave, and transmits it to the comparator 115. The comparator 115 compares the voltage command value supplied from the voltage control operation unit 113 with the carrier signal, and generates the signal PWC described above in which a logical state changes depending on a magnitude relation of the voltage value. The generated signal PWC is outputted to the switching elements Q1 and Q2 of the boost converter 200.

Figure 3:
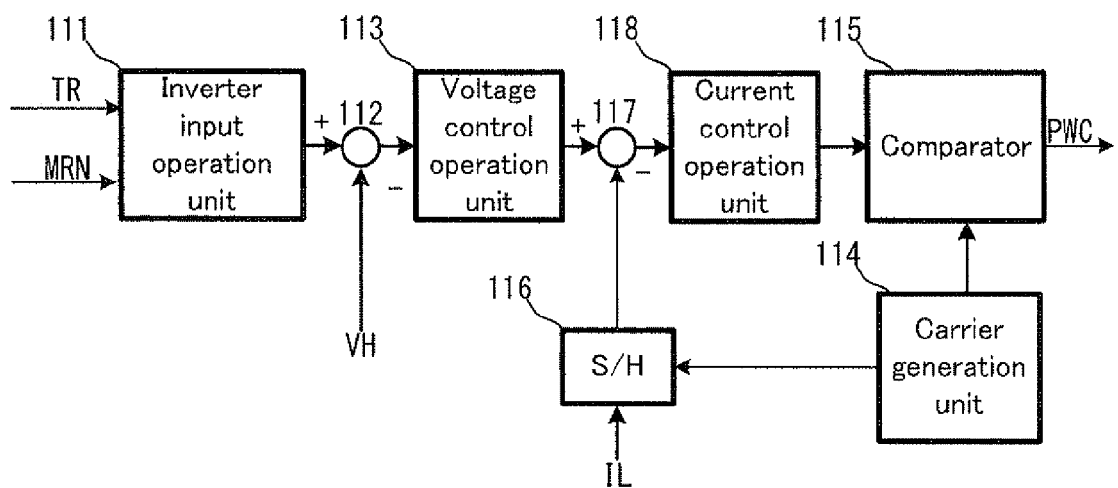
FIG. 3 is a block diagram showing another booster circuit control unit in the control apparatus for the motor drive system shown in FIG. 1.

The configuration exemplified in FIG. 2 is a circuit configuration which realizes voltage control; however, a control form of the boost converter 200 is not limited to such voltage control. Now, with reference to FIG. 3, the configuration of a boost converter control unit 110' in the control apparatus 100 will be explained. FIG. 3 is a block diagram showing the booster circuit control unit 110'. Incidentally, in FIG. 3, portions overlapping those of FIG. 2 will carry the same reference numerals, and the explanation thereof will be omitted as occasion demands.

In FIG. 3, the boost converter control unit 110' is provided with an adder-subtractor 117 and a current control operation unit 118 between the voltage control operation unit 113 and the comparator 115.

On the other hand, the carrier generation unit 114 transmits the carrier signal not only to the comparator 115 but also to a S/H (sample hold) circuit 116. The S/H circuit 116 samples the electric current IL in timings of a peak and a bottom of the carrier signal received from the carrier generation unit 114.

Here, in the boost converter control unit 110', the voltage control operation unit 113 generates a current command value IR for matching the inter-terminal voltage VH with the VH command value VHtg, and the adder-subtractor 117 subtracts a detected value of the electric current IL sampled and held by the S/H circuit 116. A subtraction result is transmitted to the current control operation unit 118.

On the current control operation unit 118, a controlled variable for matching the electric current IL with the current command value IR is calculated. At this time, for example, a known PI control operation including a proportional term (P term) and an integral term (I term) or the like is used. The current control operation unit 118 outputs the calculated controlled variable to the comparator 115 as a duty command value d.

On the comparator 115, a magnitude relation between the duty command value d and the carrier signal is compared, and the signal PWC is generated and supplied to each switching element. In other words, the boost converter control unit 110' has a circuit configuration which realizes current control. Even such a configuration makes it possible to preferably control the boost converter 200.

Figure 4:
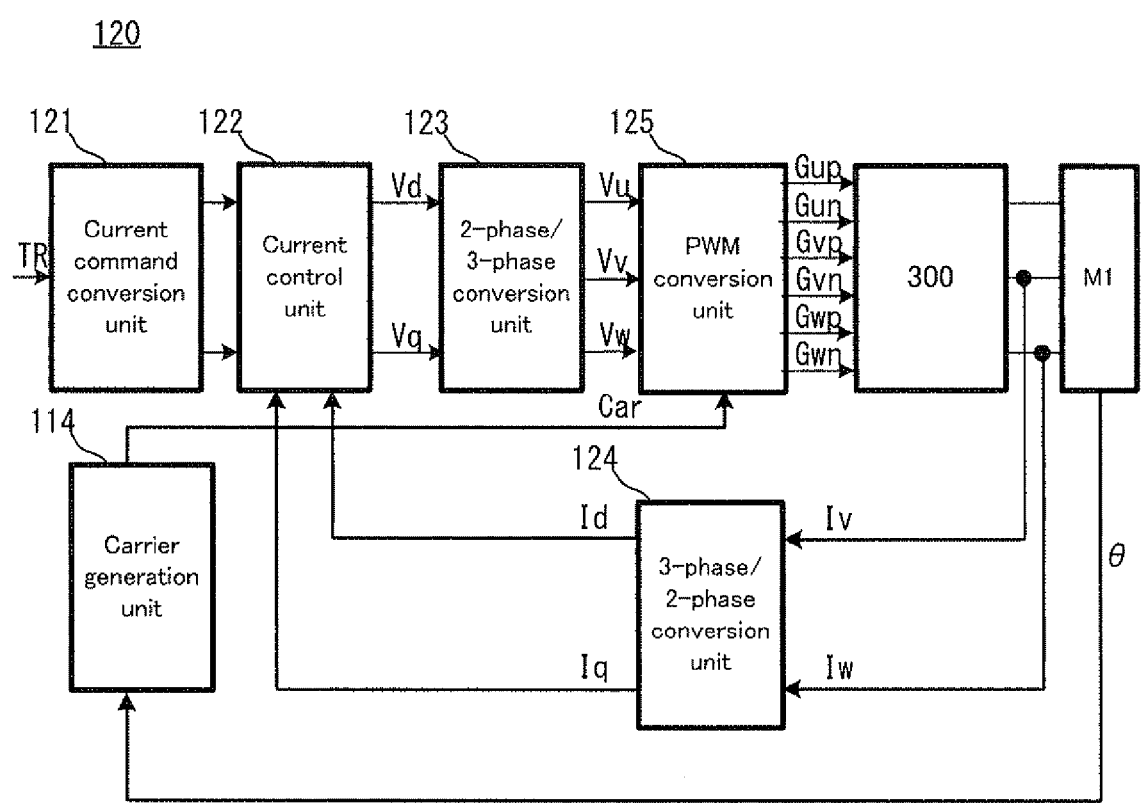
FIG. 4 is a block diagram showing an inverter control unit in the control apparatus for the motor drive system shown in FIG. 1.

Next, with reference to FIG. 4, the configuration of the inverter control unit 120 will be explained. FIG. 4 is a block diagram showing the inverter control unit 120. Incidentally, in FIG. 4, portions overlapping those of each of the drawings described above will carry the same reference numerals, and the explanation thereof will be omitted as occasion demands.

In FIG. 4, the inverter control unit 120 is provided with a current command conversion unit 121, a current control unit 122, two-phase/three-phase conversion unit 123, a three-phase/two-phase conversion unit 124, a carrier generation unit 114 (shared by the boost converter control unit 110), and a PWM conversion unit 125.

The current command conversion unit 121 generates two-phase current command values (Idtg, Iqtg) on the basis of the torque command value TR of the three-phase AC motor M1.

On the other hand, from the inverter 300, the v-phase current Iv and the w-phase current Iw are supplied to the three-phase/two-phase conversion unit 124 as feedback information. On the three-phase/two-phase conversion unit 124, from the v-phase current Iv and the w-phase current Iw, three-phase current values are converted to two-phase current values composed of a d-axis current Id and a q-axis current Iq.

The two-phase current values after converted are transmitted to the current control unit 122.

On the current control unit 122, two-phase voltage command values composed of a d-axis voltage Vd and a q-axis voltage Vq are generated, on the basis of a difference between the two-phase current command values generated on the current command conversion unit 121 and the two-phase current values Id and Iq received from the three-phase/two-phase conversion unit 124. The generated two-phase voltage command values Vd and Vq are transmitted to the two-phase/three-phase conversion unit 123.

On the two-phase/three-phase conversion unit 123, the two-phase voltage command values Vd and Vq are converted to three-phase voltage command values Vu, Vv, and Vw. The converted three-phase voltage command values Vu, Vv, and Vw are transmitted to the PWM conversion unit 125.

Here, the PWM conversion unit 125 receives a carrier Car having a predetermined carrier frequency fcar1 from the carrier generation unit 114, compares a magnitude relation between the carrier Car and the converted three-phase voltage command values Vu, Vv, and Vw, generates u-layer switching signals Gup and Gun, v-phase switching signals Gvp and Gvn and w-phase switching signals Gwp and Gwn in which a logical state changes depending on a comparison result, and supplies them to the inverter 300.

More specifically, of the switching signals corresponding to the each phase of the three phases, signals with an identifier of "p" added mean drive signals for driving the p-side switching elements (Q3, Q5, and Q7) of the switching elements of the respective phase of the three phases, and signals with an identifier of "n" added mean drive signals for driving the n-side switching elements (Q4, Q6, and Q8) of the switching elements of the respective phase of the three phases.

Here, in particular, in the comparison between the carrier Car and each phase voltage command value, if each phase voltage command value matches the carrier Car from a value smaller than the carrier Car, a switching signal for turning on the p-side switching element is generated. Moreover, if each phase voltage command value matches the carrier Car from a value larger than the carrier Car, a switching signal for turning on the n-side switching element is generated. In other words, the switching signal is configured such that ON and OFF thereof are inseparable like two sides of an object, and the switching elements in each phase are configured such that either the p-side or the n-side is always in an ON state and the other is in an OFF state.

If the inverter 300 is changed into or maintained in the drive state of each of the switching elements defined by the switching signals in each phase, the three-phase AC motor M1 is driven in accordance with a circuit state corresponding to the changed or maintained drive state. Incidentally, such an aspect of controlling the inverter 300 is one aspect of so-called PWM control.

<Operations of Embodiment>

Next, as operations of the embodiment, VH peak reduction control performed by the control apparatus 100 will be explained.

<Outline of VH Peak Reduction Control>

Figure 5:
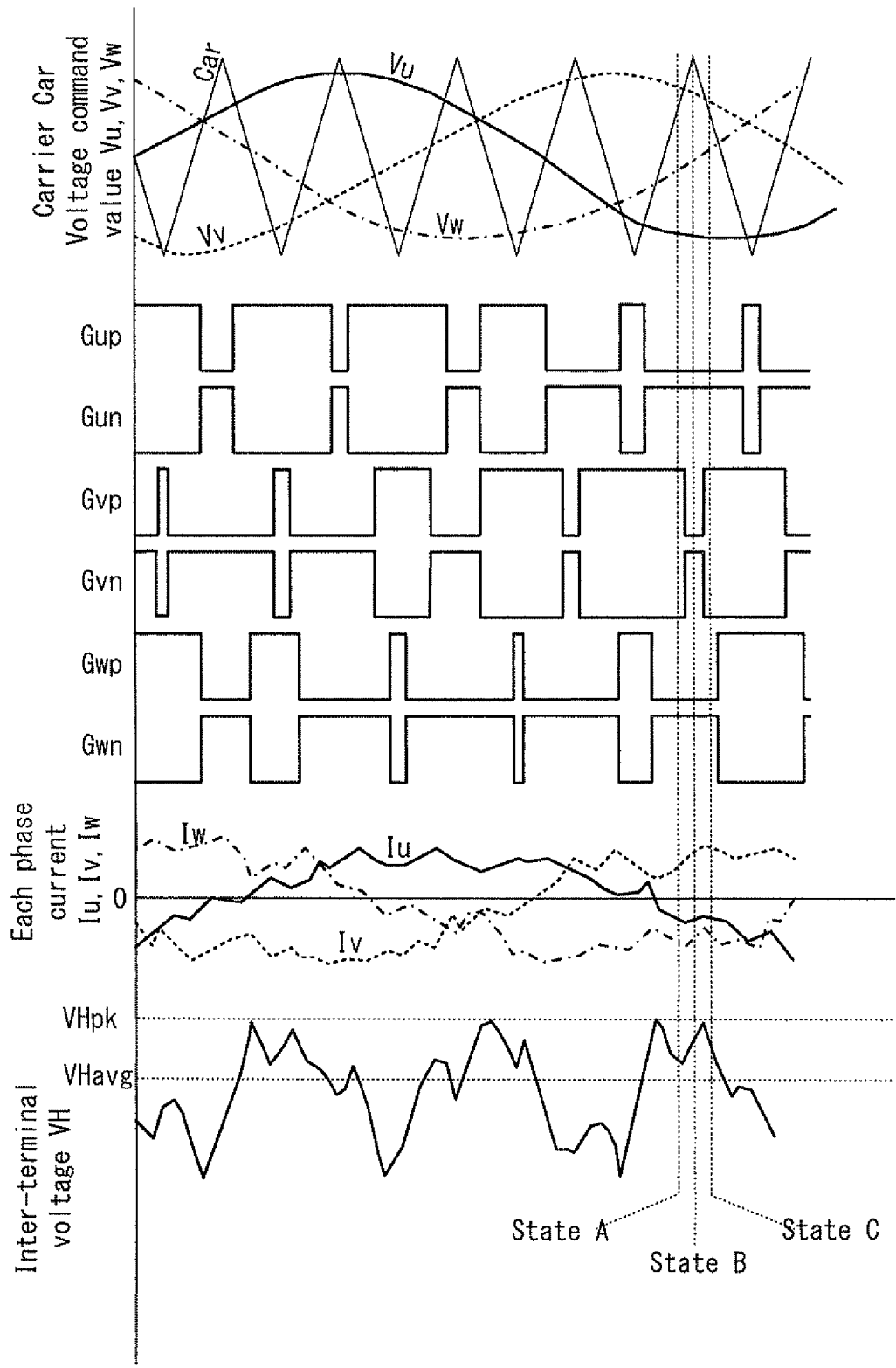
FIG. 5 is a timing chart exemplifying one operating state of the motor drive system shown in FIG. 1.

Firstly, with reference to FIG. 5, an outline of the VH peak reduction control will be explained. FIG. 5 is a timing chart exemplifying one operating state of the motor drive system 10. Incidentally, in FIG. 5, portions overlapping those of each of the drawings described above will carry the same reference numerals, and the explanation thereof will be omitted as occasion demands.

FIG. 5 exemplifies time transition of the carrier Car and each phase voltage command value, each phase switching signal, each phase current, and the inter-terminal voltage VH.

In FIG. 5, in view of the time transition of the inter-terminal voltage VH, it is seen that a VH peak (which is herein expressed uniformly as VHpk for convenience of explanation), which projects in comparison with an average value VHavg, appears periodically. The VH peak reduction control is control for reducing the VH peak (i.e. the inter-terminal voltage VH in peak generation timing).

Now, the reason that the VH peak appears will be explained by taking the v-phase arm by way of example. Here, a state A, a state B, and a state C are defined as shown in the drawing. The state A is a state in which the n-side switching element Q6 of the v-phase arm is in the OFF state, the state B is a state in which the switching element Q6 transits from the OFF state to the ON state, and the state C is a state in which the switching element Q6 transmits from the ON state to the OFF state again.

Figure 6:
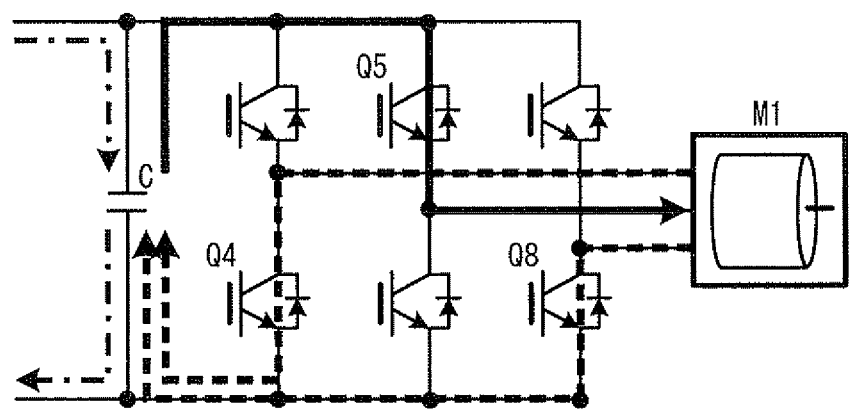
FIG. 6 are operation conceptual diagrams conceptually showing operating states of an inverter in states A, B, and C shown in FIG. 5.
Figure 6:
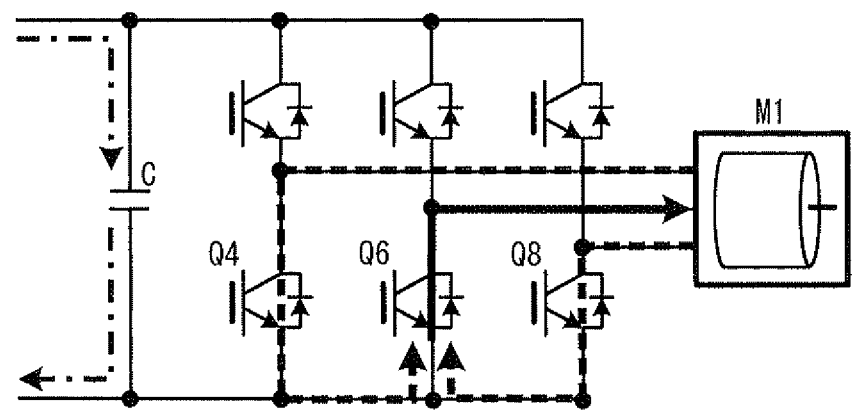

With reference to FIG. 6, operating states of the inverter 300 in the respective states will be explained. FIG. 6 are operation conceptual diagrams conceptually showing the operating states of the inverter 300. Incidentally, in FIG. 6, portions overlapping those of FIG. 1 will carry the same reference numerals, and the explanation thereof will be omitted as occasion demands. Incidentally, in FIG. 6, for convenience of explanation, the reference numerals are added only to the switching elements in the ON state.

In FIG. 6, FIG. 6(a) shows the operating state of the inverter 300 in the state A and the state C. Namely, the n-side switching element Q6 of the v-phase arm is in the OFF state. In this case, the v-phase arm brings out electric power from the smoothing condenser C and supplies it to the three-phase AC motor M1 via the p-side switching element Q5 (refer to a solid line). Therefore, the inter-terminal voltage VH of the smoothing condenser C decreases in a period of being in those states.

On the other hand, FIG. 6(b) exemplifies the operating state of the inverter 300 in the state B. In the state B, the n-side switching element Q6 of the v-phase arm is in the ON state. In this case, the electric power is not brought out from the smoothing condenser C, and in such a period, the inter-terminal VH of the smoothing condenser C increases by the action of the boost converter 200 described above.

Therefore, if the state transition occurs from the state A through the state B to the state C, the peak is generated in the inter-terminal VH in the state transition from the state B in which VH increases to the state C in which VH decreases. More specifically, in each phase arm, the inter-terminal voltage VH has the peaks on the high voltage side (1) in first timing in which a positive current flows and in which the p-side switching element is turned on and (2) second timing in which a negative current flows and in which the n-side switching element is turned on. The VH peak reduction control uses this point to realize the reduction of the VH peak.

Figure 7:
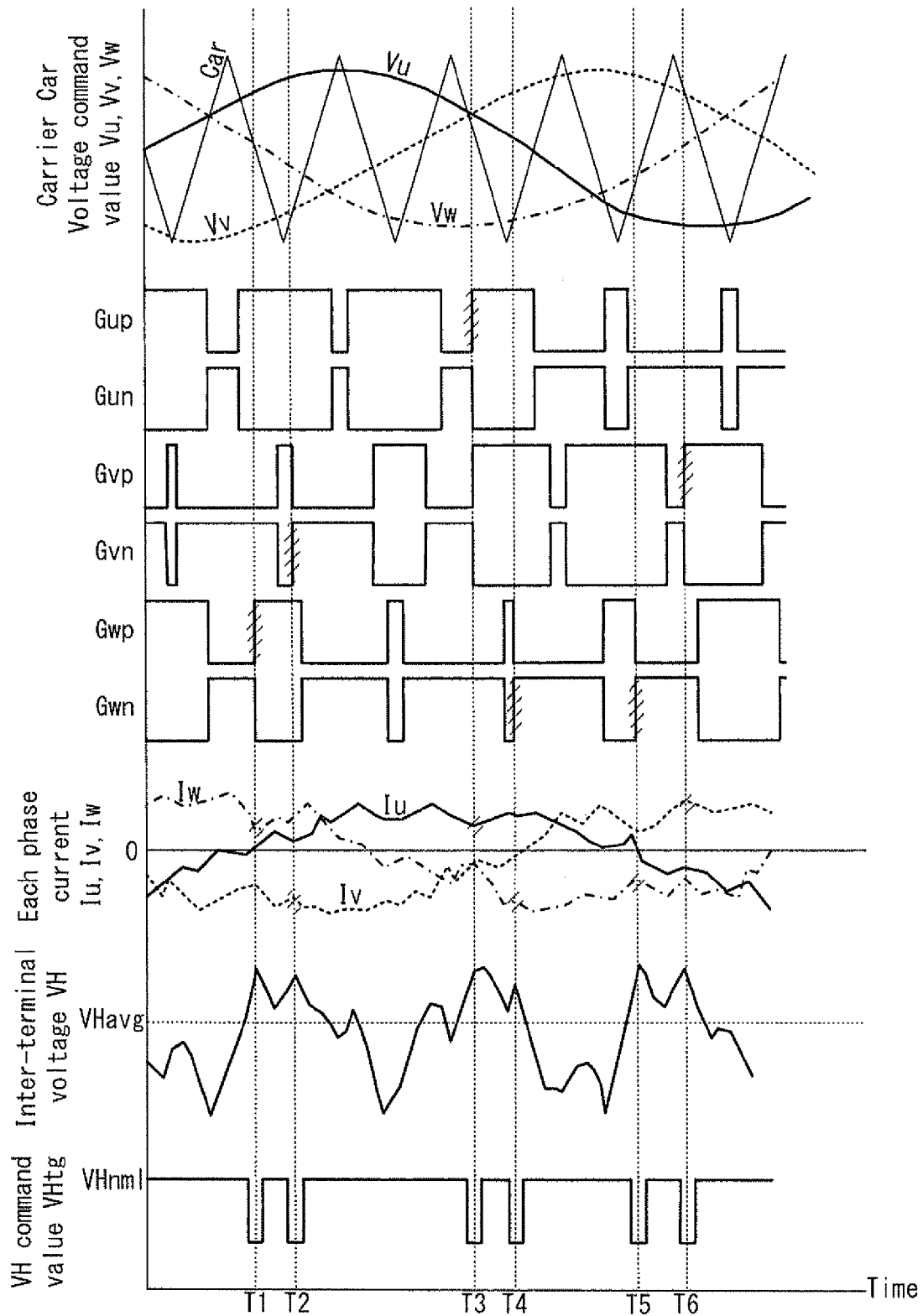
FIG. 7 is a timing chart explaining an outline of VH peak reduction control in the motor drive system shown in FIG. 1.

Now, with reference to FIG. 7, actual operation of the VH peak reduction control will be explained. FIG. 7 is a timing chart explaining one operating state of the motor drive system 10, in a process of performing the VH peak reduction control. Incidentally, in FIG. 7, portions overlapping those of FIG. 5 will carry the same reference numerals, and the explanation thereof will be omitted as occasion demands.

In FIG. 7, a hatching portion in each phase switching signal is a portion corresponding to the points (1) and (2) described above. In FIG. 7, the u-phase, the v-phase, and the w-phase have one, two, and three times of peak timing, respectively.

In the VH peak reduction control, by using that the peak point is known in advance, the VH command value VHtg is corrected temporarily to the reduction side before the peak timing comes. As a result, the VH peak is reduced.

Figure 8:
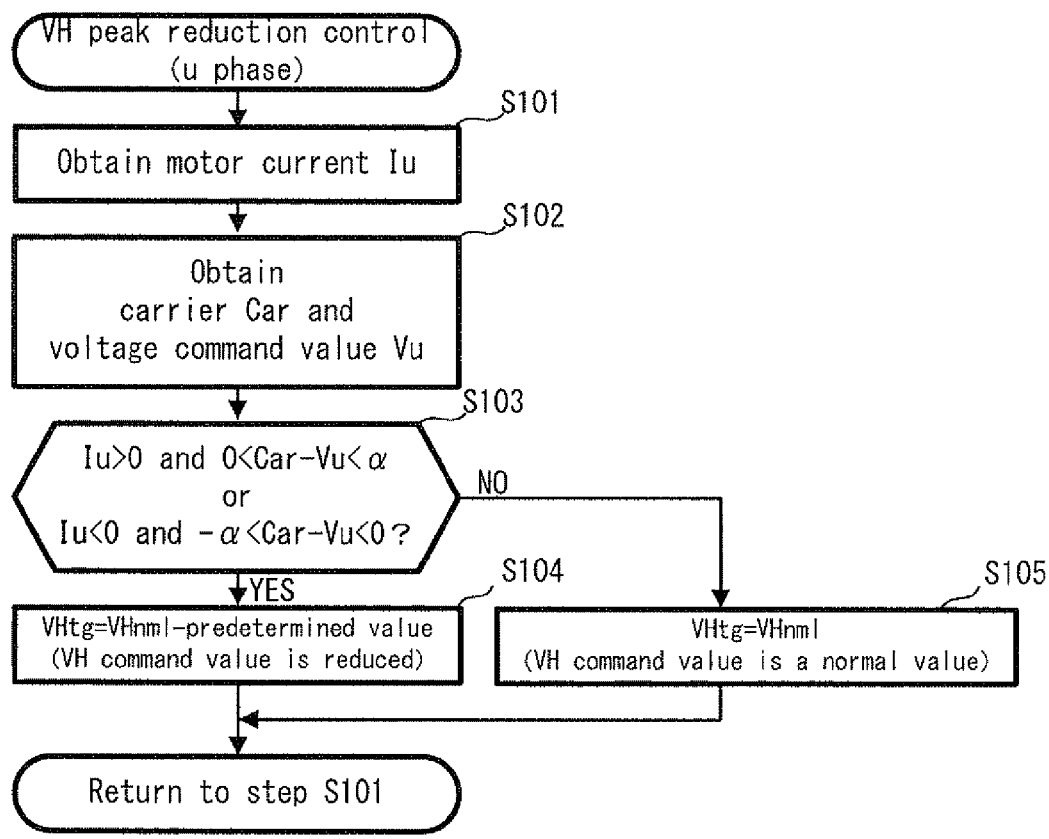
FIG. 8 is a flowchart showing the VH peak reduction control performed by the control apparatus in the motor drive system shown in FIG. 1.

An actual control flow of the VH peak reduction control will be explained with reference to FIG. 8. FIG. 8 is a flowchart showing the VH peak reduction control. Incidentally, FIG. 8 shows a control flow regarding the u-phase arm. The same process is performed for the other phases.

In FIG. 8, the control apparatus 100 obtains a u-phase motor current Iu (step S101). Then, the control apparatus 100 obtains the carrier Car and the u-phase voltage command value Vu (step S102).

If obtaining each of the values, the control apparatus 100 judges whether or not the u-phase motor current Iu is a positive current and a difference between the carrier Car and the u-phase voltage command value Vu is greater than zero and less than a predetermined value a (i.e. whether or not the point (1) is satisfied), and whether or not the u-phase motor current Iu is a negative current and the difference between the carrier Car and the u-phase voltage command value Vu is less than zero and greater than the predetermined value a (i.e. whether or not the point (2) is satisfied) (step S103).

If the conditions are not satisfied (the step S103: NO), the control apparatus 100 sets the VH command value VHtg to a normal value VHnml (step S105) and returns the process to the step S101. In other words, in this case, it is judged to be not the peak timing of the inter-terminal voltage VH, and the inter-terminal voltage VH is maintained.

If the conditions are satisfied (the step S103: YES), the control apparatus 100 sets the VH command value VHtg to a value obtained by subtracting a predetermined value from the normal value VHnml and reduces the VH command value (step S104). If the VH command value is reduced, the process is returned to the step S101. The VH peak reduction control is performed in the above manner.

As described above, according to the VH peak reduction control in the first embodiment, by predicting the peak timing in which the peak is generated in the inter-terminal voltage VH of the smoothing condenser C and by reducing the VH command value VHtg before the peak timing comes, it is possible to suppress the increase of the VH peak. Therefore, the smoothing condenser C can be protected without adopting a method which is undesirable from the viewpoint of cost and ease of installation, such as increasing a withstand voltage and a capacity of the smoothing condenser.

Figure 9:
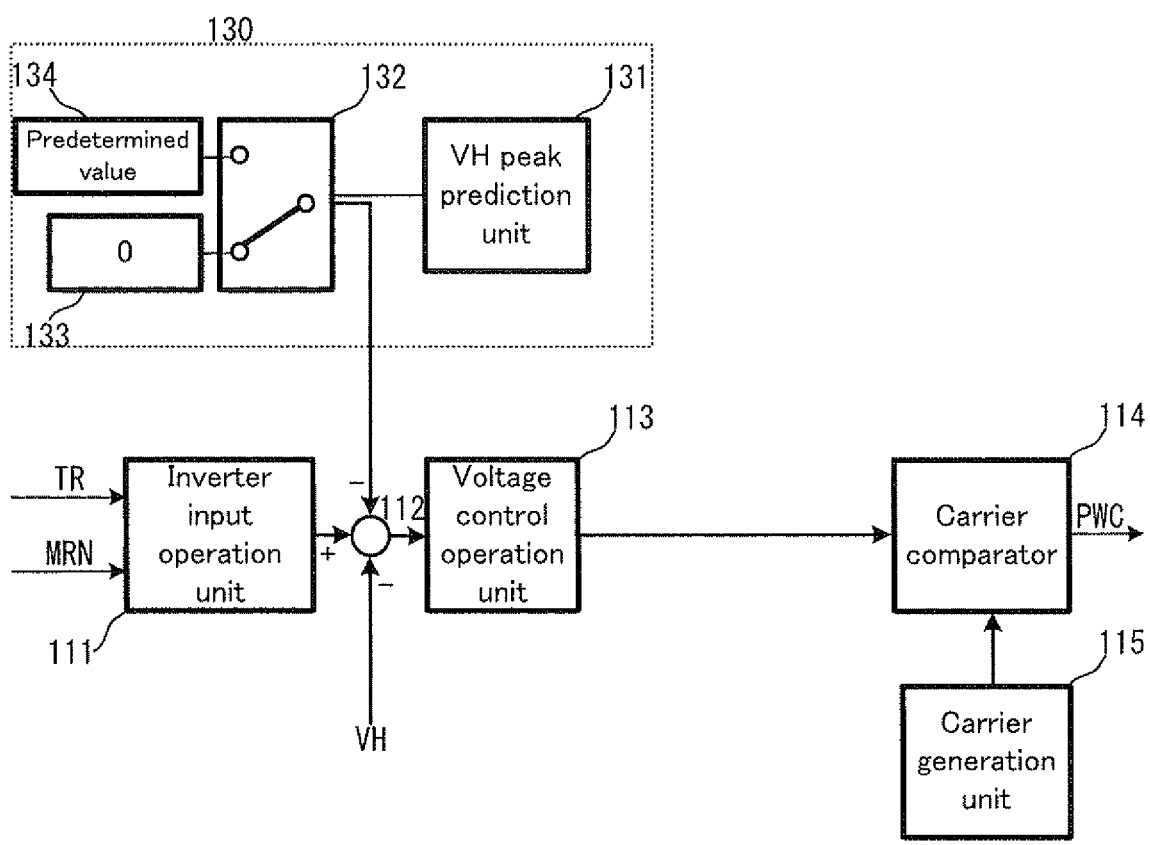
FIG. 9 is a block diagram showing another inverter control unit in the control apparatus for the motor drive system shown in FIG. 1.

In performing the VH peak reduction control, the boost converter control unit 110 is controlled, as occasion demands, by a VH peak reduction unit 130 which is also one functional unit of the control apparatus 100. Now, with reference to FIG. 9, the configuration of the VH peak reduction unit 130 will be explained. FIG. 9 is a block diagram showing the VH peak reduction unit 130 and its associated parts. Incidentally, in FIG. 9, portions overlapping those of FIG. 2 will carry the same reference numerals, and the explanation thereof will be omitted as occasion demands.

In FIG. 9, the VH peak reduction unit 130 is provided with a VH peak prediction unit 131, a selection switch 132, and memories 133 and 134.

The VH peak prediction unit 131, as described above, is an apparatus for predicting the peak generation timing of the inter-terminal voltage VH by comparing each phase motor current and the carrier signal. The selection switch 132 is configured such that the switching state is selectively changed to the memory side or the memory 134 side by the VH peak prediction unit 131. In the memory 133, "0" is stored as a fixed value, and in the memory 134, a "predetermined value" is stored as a fixed value.

The VH peak reduction unit 130 is configured to transmit one of control values selected by the selection switch 132 as an output value to the adder-subtractor 112 in the boost converter control unit 110. If a control value of "0" is selected by the memory 133, there is no change in the VH command value VHtg. On the other hand, if the memory 134 is selected and a control value of the "predetermined value" is selected, VHtg is subtracted practically by the predetermined value and is used for an arithmetic process on the voltage control operation unit 113. As a result, the voltage increase in the state B described above is suppressed, and the amount of peaks generated is suppressed in transition timing to the state C (i.e. timing of turning on the p-side switching element).

Second Embodiment

In the first embodiment, the boost converter 200 as the "second power converter" of the present invention is used; however, a configuration example of the second power converter is not limited to the boost converter 200. Here, such a second embodiment will be explained.

Figure 10:
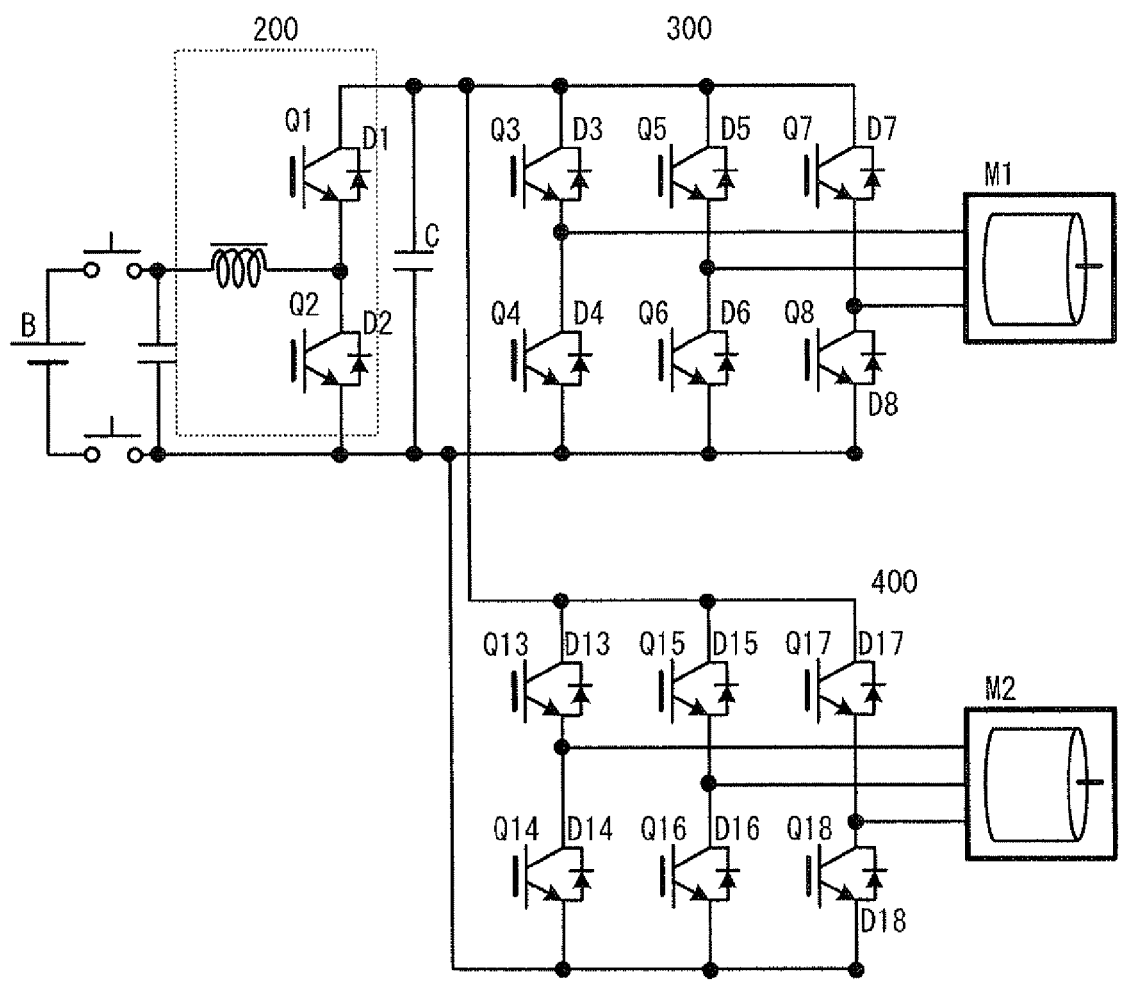
FIG. 10 is a system configuration diagram showing a motor drive system in a second embodiment of the present invention.

Firstly, with reference to FIG. 10, a motor drive system 20 in the second embodiment will be explained. FIG. 10 is a system configuration diagram showing the motor drive system 20. Incidentally, in FIG. 10, portions overlapping those of FIG. 1 will carry the same reference numerals, and the explanation thereof will be omitted as occasion demands.

In FIG. 10, the motor drive system 20 is provided with an inverter 400 having the same configuration as that of the inverter 300 and a three-phase AC motor M2 driven by the inverter 400. The inverter 400 is placed electrically in parallel with the inverter 300.

The inverter 400 is provided with p-side switching elements Q13, Q15, and Q17 and n-side switching elements Q14, Q16, and Q18 in the u-phase, the v-phase, and the w-phase, respectively, as switching elements. The same is true for rectifying diodes.

Figure 11:
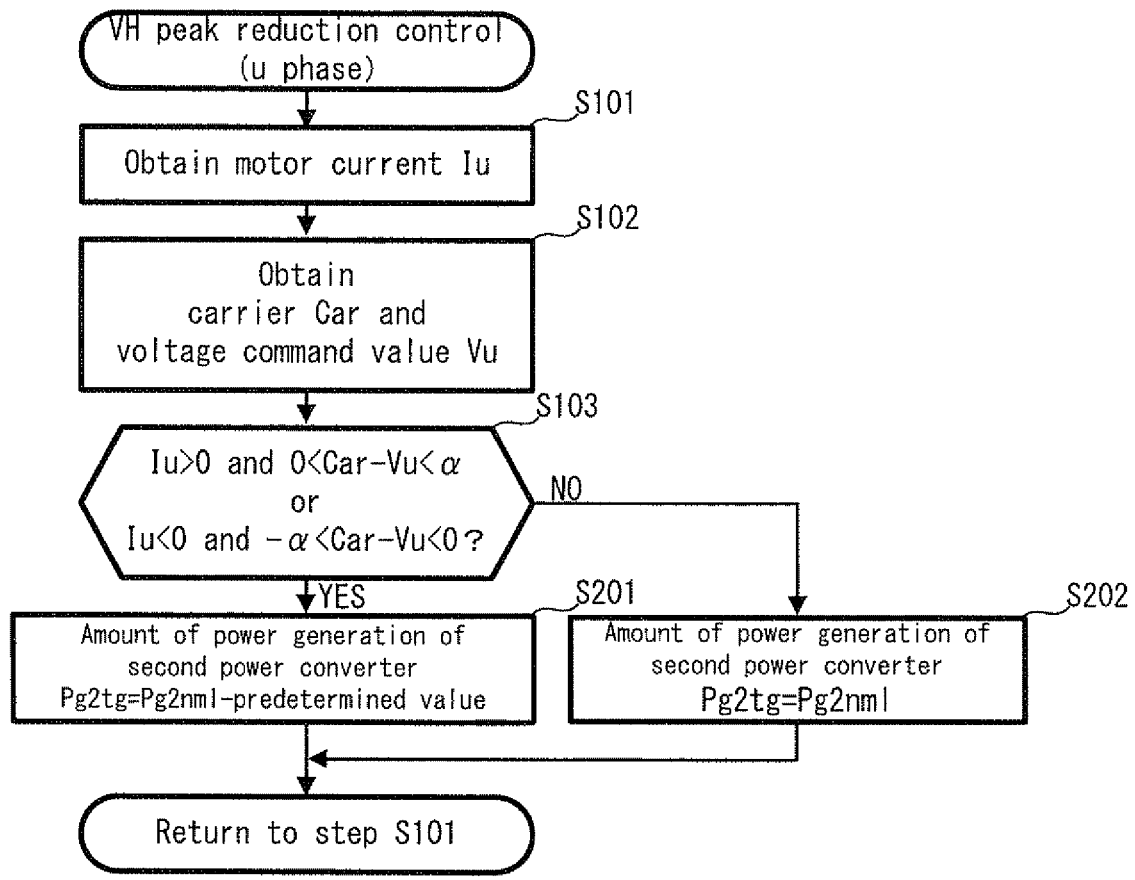
FIG. 11 is a flowchart showing VH peak reduction control in the second embodiment.

Next, the VH peak reduction control in the configuration will be explained with reference to FIG. 11. FIG. 11 is a flowchart showing the VH peak reduction control in the second embodiment. Incidentally, in FIG. 11, portions overlapping those of FIG. 8 will carry the same reference numerals, and the explanation thereof will be omitted as occasion demands.

In FIG. 11, if the judgment process associated with the peak generation timing in which the peak is generated in the inter-terminal voltage VH of the smoothing condenser C (the step S103) branches to the "YES" side, i.e. if it is judged that the peak generation timing will come in a near future, the control apparatus 100 sets a Pg2tg as a target value of the amount of power generation Pg2 of the second power converter (inverter 400) to a value obtained by subtracting a predetermined value from a normal value Pg2nml (step S201). On the other hand, if the step S103 branches to the "NO" side, the control apparatus 100 maintains the amount of power generation of the second power converter at the reference value Pg2nml (step S202). The VH peak reduction control in the second embodiment is performed in the above manner.

According to the VH peak reduction control in the second embodiment, instead of reducing the VH command value VHtg by using the boost converter 200, the amount of power generation of the inverter 400 as the second power converter is changed. Even in this manner, it is possible to reduce the inter-terminal voltage VH of the smoothing condenser C and to reduce the VH peak.

Third Embodiment

In the first and second embodiments, there is uniformly taken the measure associated with the VH peak reduction in the peak generation timing in which the peak is generated in the inter-terminal voltage VH of the smoothing condenser C. A third embodiment discloses a control form different from the above control. Incidentally, the configuration of a motor drive system in the embodiment is the same as that of the motor drive system 10 in the first embodiment.

Figure 12:
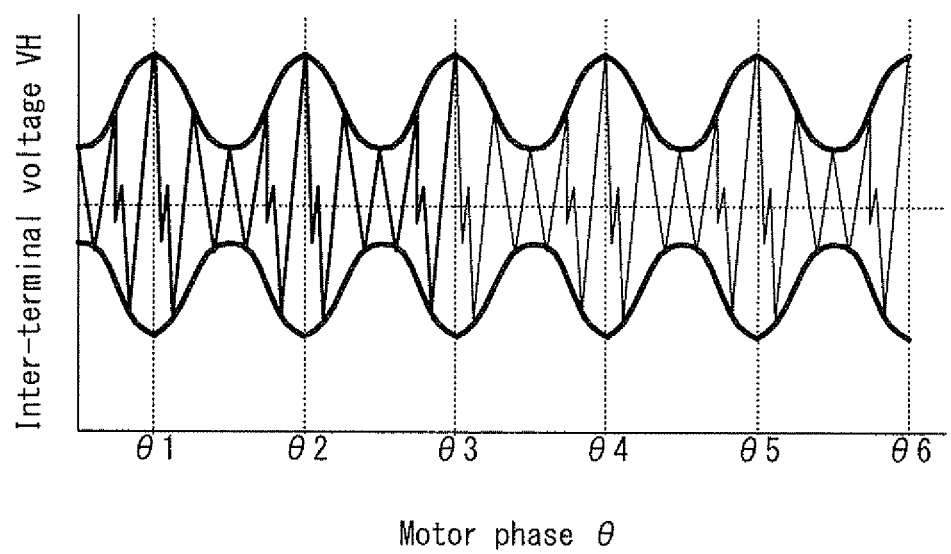
FIG. 12 is a view exemplifying a relation between an inter-terminal voltage VH and a motor phase in a third embodiment.

Firstly, with reference to FIG. 12, a relation between the VH peak and a motor phase θ will be explained. FIG. 12 is a view exemplifying the relation between the inter-terminal voltage VH and the motor phase θ.

As shown in FIG. 12, the magnitude of the VH peak actually generated in the motor drive system 10 is not uniform. Conceptually, as shown in the drawing, the VH peak is maximal at a particular motor phase (refer to θ1 to θ6 shown in the drawing), and an envelope connecting the VH peaks has a sinusoidal shape.

Figure 13:
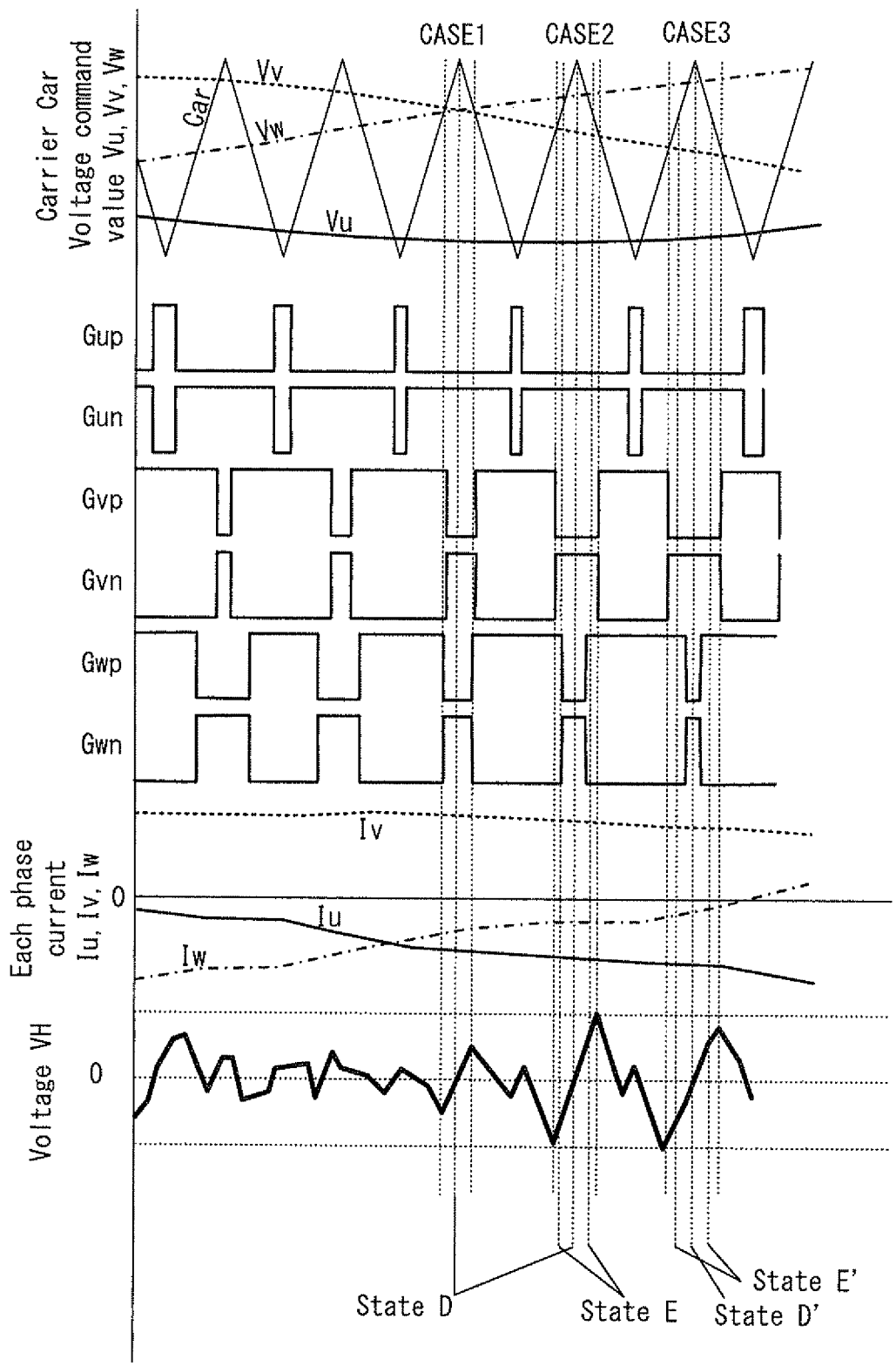
FIG. 13 is a timing chart exemplifying one operating state of the motor drive system to explain the relation shown in FIG. 12.

Now, using FIG. 13, this phenomenon will be explained. FIG. 13 is a timing chart exemplifying another operating state of the motor drive system 10. Incidentally, in FIG. 13, portions overlapping those of FIG. 7 will carry the same reference numerals, and the explanation thereof will be omitted as occasion demands.

Figure 14:
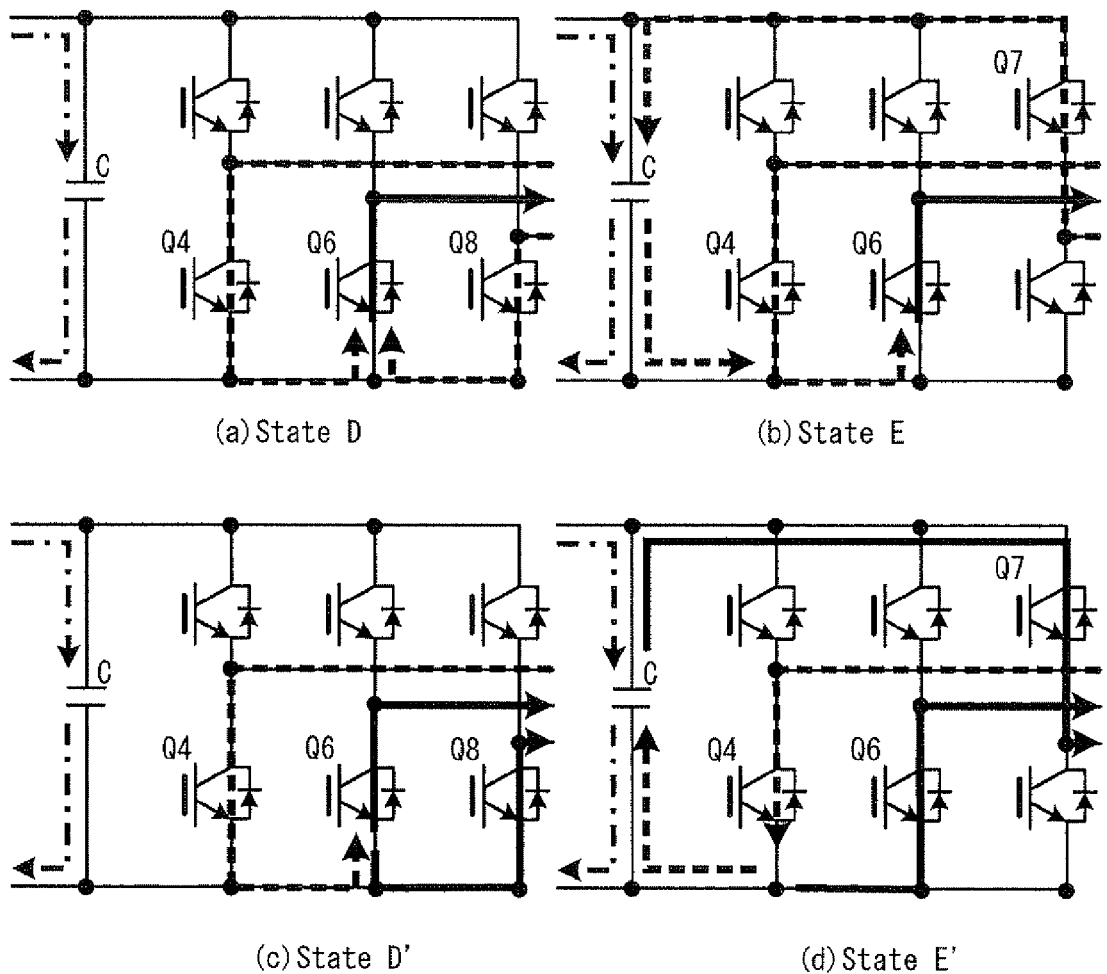
FIG. 14 are views conceptually showing operating states of the inverter in states D, E, D' and E' shown in FIG. 13.

In FIG. 13, three types of states, CASE1, CASE2, and CASE3, are considered in which the v-phase motor current Iv is a positive current and the switching signal Gvn is in the ON state. Moreover, as the operating states of the inverter 300 corresponding to the three types of peak states, a state D, a state E, a state D', and a state E' are defined, as occasion demands. At this time, the visual operating states of the inverter 300 are as shown in FIG. 14. FIG. 14 are views conceptually showing the operating states of the inverter in the states D, E, D' and E'. Incidentally, in FIG. 13, portions overlapping those of FIG. 6 will carry the same reference numerals, and the explanation thereof will be omitted as occasion demands.

In FIG. 14, FIG. 14(a), FIG. 14(b), FIG. 14(c), and FIG. 14(d) correspond to the state D, the state E, the state D', and the state E', respectively, and all of them show the operating states of the inverter 300 in the case where the v-phase motor current Iv is positive and the switching signal Gvn is in the ON state. Incidentally, in each of the drawings, a flow of the electric current outputted from the three-phase AC motor M1 is shown by a thick dashed line, and a flow of the electric current directed to the three-phase AC motor M1 is shown by a thick solid line. In each state shown in each drawing, the VH peak is determined by switching timing and a motor current at that time point.

Here, back in FIG. 13 as occasion demands, an explanation is given. If the CASE 1 and the CASE 2 are compared, the CASE 2 has a longer duration in which the switching signal Gvn is in the ON state, and thus, a rise time of the inter-terminal voltage VH is longer. In addition, since the CASE2 adopts the state E in which the degree of the increase in the inter-terminal voltage VH is large, the VH peak relatively increases.

On the other hand, if the CASE 2 and the CASE 3 are compared, the CASE 3 has a longer duration in which the switching signal Gvn is in the ON state. However, the v-phase motor current Iv is in an opposite direction to that in the CASE 2, and the CASE 3 adopts not the state E but the state E'. Thus, the rise time of the inter-terminal voltage VH is longer but the inclination thereof becomes smaller, and the VH peak becomes larger in the CASE 2.

In drive control of the three-phase AC motor M1 in the embodiment, the peak of the inter-terminal voltage VH appears near where the motor current is zero, and the number of the times is six in one electrical cycle. Such a motor phase θ in which the VH peak is particularly large (hereinafter, referred to as a "reduction-target phase", as occasion demands) can be obtained, experimentally, experientially, or theoretically in advance for each of the three phases. In the VH peak reduction control in the third embodiment, information about the reduction-target phase is used, and efficient reduction of the VH peak can be performed.

Figure 15:
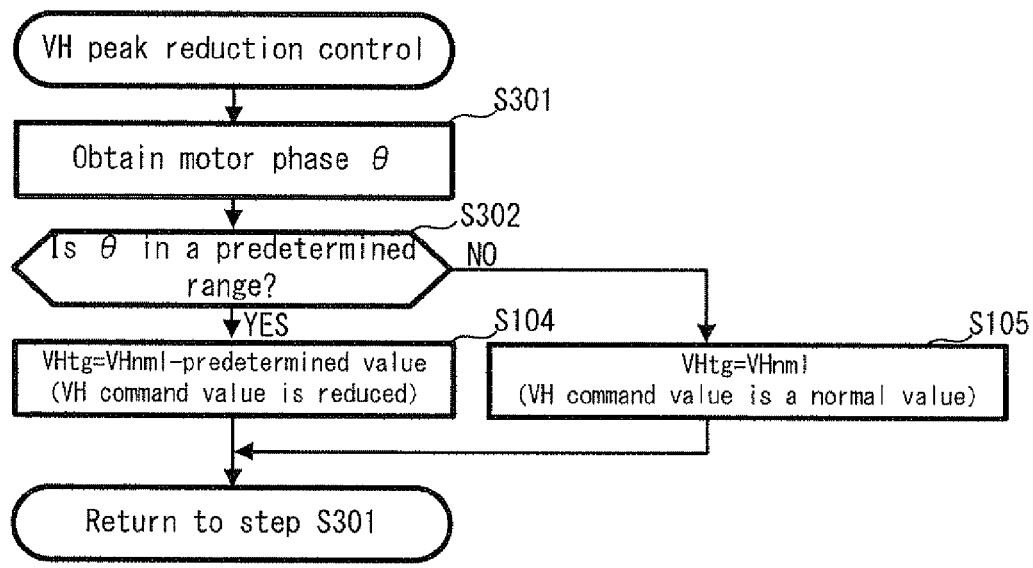
FIG. 15 is a flowchart showing VH peak reduction control in the third embodiment.

Now, with reference to FIG. 15, the details of the VH peak reduction control in the third embodiment will be explained. FIG. 15 is a flowchart showing the VH peak reduction control. Incidentally, in FIG. 15, portions overlapping those of FIG. 8 will carry the same reference numerals, and the explanation thereof will be omitted as occasion demands.

In FIG. 15, the control apparatus 100 obtains the motor phase θ (step S301) and judges whether or not the obtained motor phase θ has a value in a predetermined range including the aforementioned reduction-target phase (step S302).

If the obtained motor phase θ has the value in the predetermined range (the step S302: YES), the control apparatus 100 reduces the VH command value VHtg (the step S104). Moreover, if the obtained motor phase θ does not have the value in the predetermined range (the step S302: NO), the control apparatus 100 maintains the VH command value VHtg without reducing it (the step S105).

Figure 16:
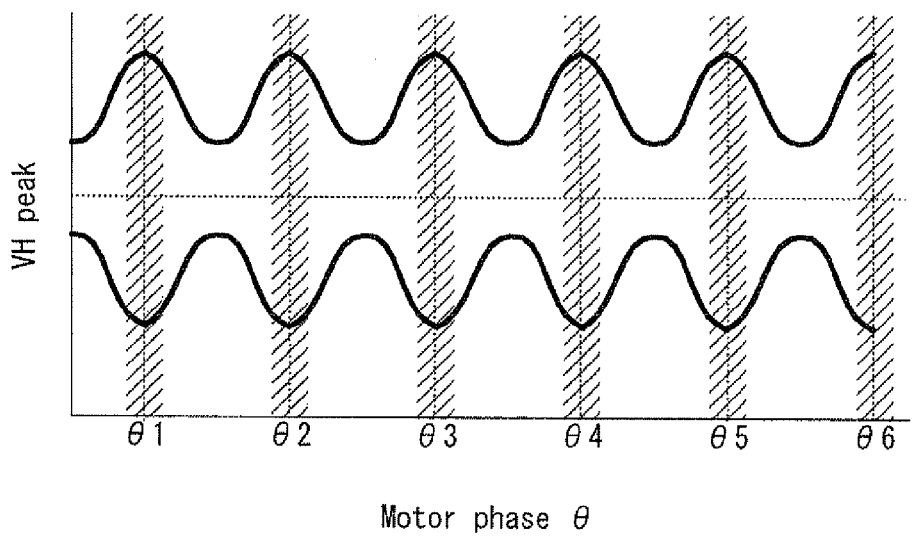
FIG. 16 is a view visually explaining the content of the VH peak reduction control shown in FIG. 15.

A visual explanation on the VH peak reduction control in the third embodiment as described above is as shown in FIG. 16. FIG. 16 is a view visually explaining the content of the VH peak reduction control in the third embodiment. Incidentally, in FIG. 16, portions overlapping those of FIG. 12 will carry the same reference numerals, and the explanation thereof will be omitted as occasion demands.

In FIG. 16, the relation between the VH peak and the motor phase θ is, as shown in the drawing, in a sinusoidal shape. Here, the motor phases θ1, θ2, θ3, θ4, θ5, and θ6 are motor phases in which the relatively large VH peak corresponding to the peak of the sine wave and corresponding to the aforementioned reduction-target phase is generated. Thus, in the embodiment, in a motor phase range corresponding to illustrated hatching areas including them, the VH command value VHtg is reduced by the control of the boost converter 200.

As a result, the VH peak is leveled, and it is possible to effectively suppress the VH peak while suppressing reduction frequency of the VH command value, in comparison with the case where the VH command value is reduced in the peak generation timing regardless of the magnitude of the VH peak, as in the first and second embodiments.

Incidentally, if the motor drive system has the configuration as illustrated in FIG. 10 as the second embodiment, the measure to reduce the amount of power generation in the step S201 in FIG. 11 may be taken instead of the VH command value reduction process in the step S104.

Fourth Embodiment

Next, a fourth embodiment of the present invention will be explained.

Figure 17:
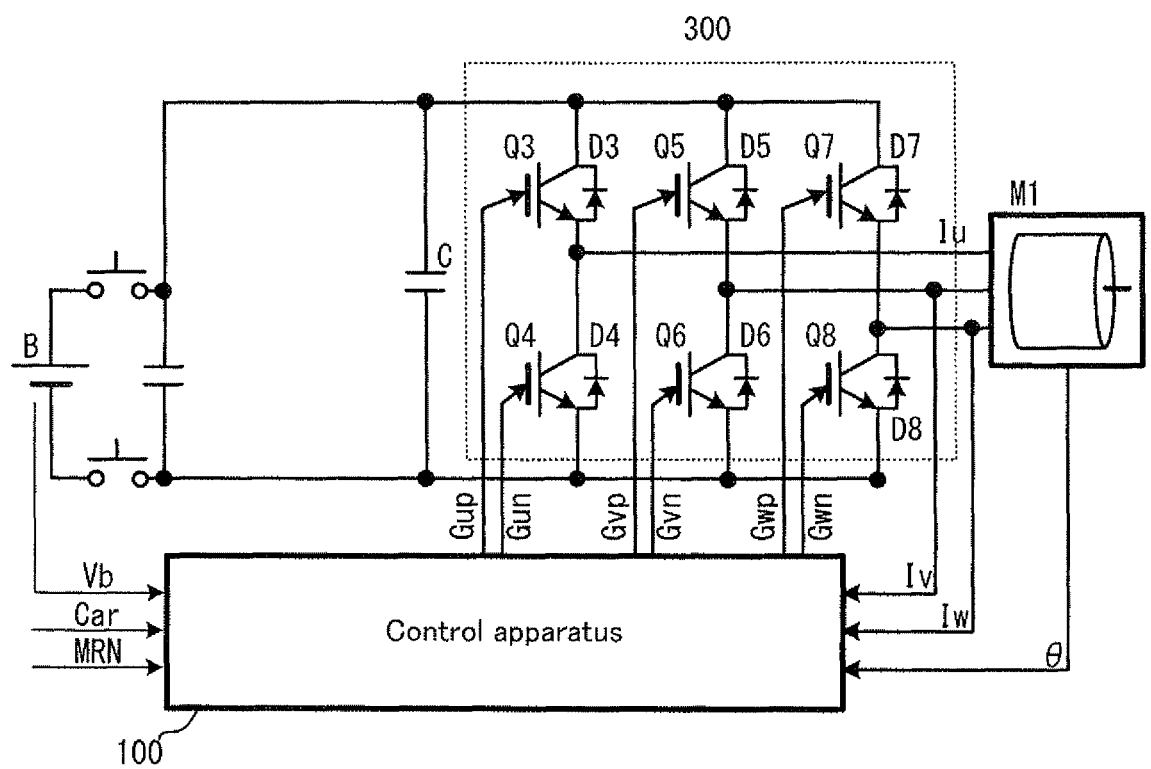
FIG. 17 is a system configuration diagram showing a motor drive system in a fourth embodiment of the present invention.

Firstly, with reference to FIG. 17, the configuration of a motor drive system 30 in the fourth embodiment will be explained. FIG. 17 is a system configuration diagram showing the motor drive system 30 in the fourth embodiment. Incidentally, in FIG. 17, portions overlapping those of FIG. 1 will carry the same reference numerals, and the explanation thereof will be omitted as occasion demands.

In FIG. 17, the motor drive system 30 is different from the motor drive system 10 in the first embodiment in that the boost converter 200 is not provided.

Figure 18:
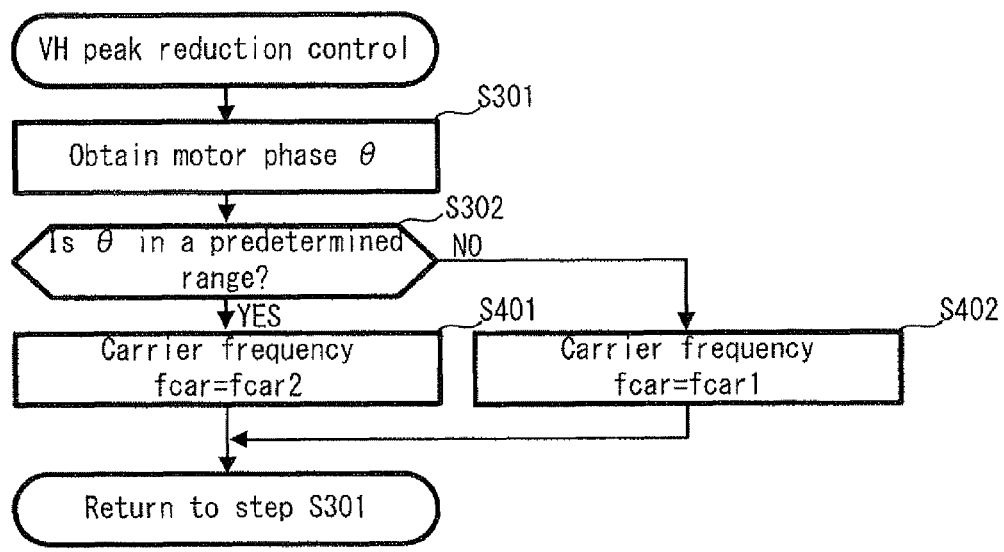
FIG. 18 is a flowchart showing VH peak reduction control in the fourth embodiment.

Next, with reference to FIG. 18, the details of the VH peak reduction control in this configuration will be explained. FIG. 18 is a flowchart showing the VH peak reduction control in the fourth embodiment. Incidentally, in FIG. 18, portions overlapping those of FIG. 15 will carry the same reference numerals, and the explanation thereof will be omitted as occasion demands.

In FIG. 18, if the obtained motor phase θ has the value in the predetermined range including the reduction-target phase (the step S302: YES), the control apparatus 100 sets a carrier frequency fcar, which is the frequency of the carrier Car generated by the carrier generation unit 114, to fcar2 (fcar2>fcar1). In other words, the control apparatus 100 corrects the carrier frequency to the high frequency side. On the other hand, if the obtained motor phase θ does not have the value in the predetermined range (the step S302: NO), the control apparatus 100 maintains the carrier frequency fcar at fcar1, which is a normal value (step S402). The VH peak reduction control in the fourth embodiment is performed in the above manner.

Figure 19:
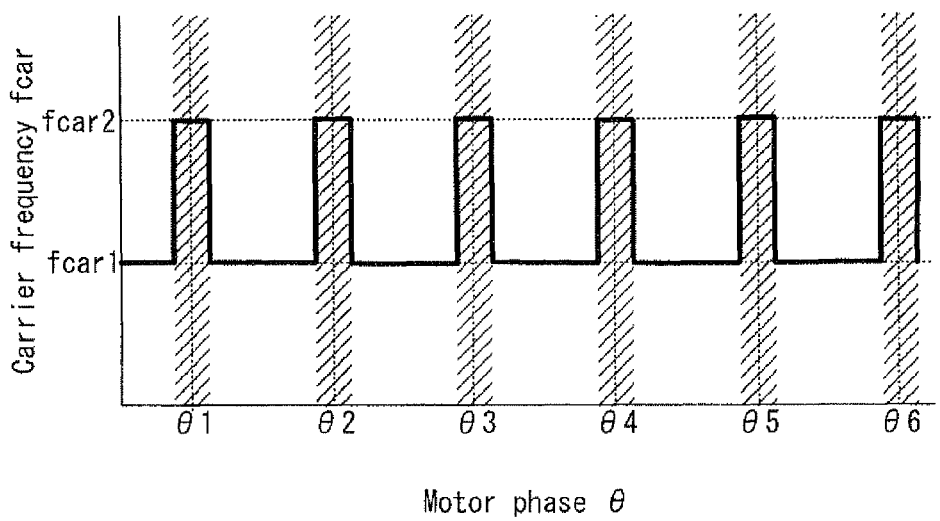
FIG. 19 is a view visually explaining the content of the VH peak reduction control shown in FIG. 18.

Now, with reference to FIG. 19, the content of the VH peak reduction control as described above will be visually explained. FIG. 19 is a view visually explaining the content of the VH peak reduction control in the fourth embodiment. Incidentally, in FIG. 19, portions overlapping those of FIG. 16 will carry the same reference numerals, and the explanation thereof will be omitted as occasion demands.

In FIG. 19, the vertical axis and the horizontal axis show the carrier frequency fear and the motor phase θ, respectively. At this time, as in FIG. 16, the reduction-target phases θ1 to θ6 are shown. The predetermined range including the reduction-target phase is shown as illustrated hatching areas as in FIG. 16.

In the VH peak reduction control in the embodiment, the carrier frequency fear is set to fcar2 in the illustrated hatching areas, and the carrier frequency fear is maintained at fcar1 in the other phase area.

Figure 20:
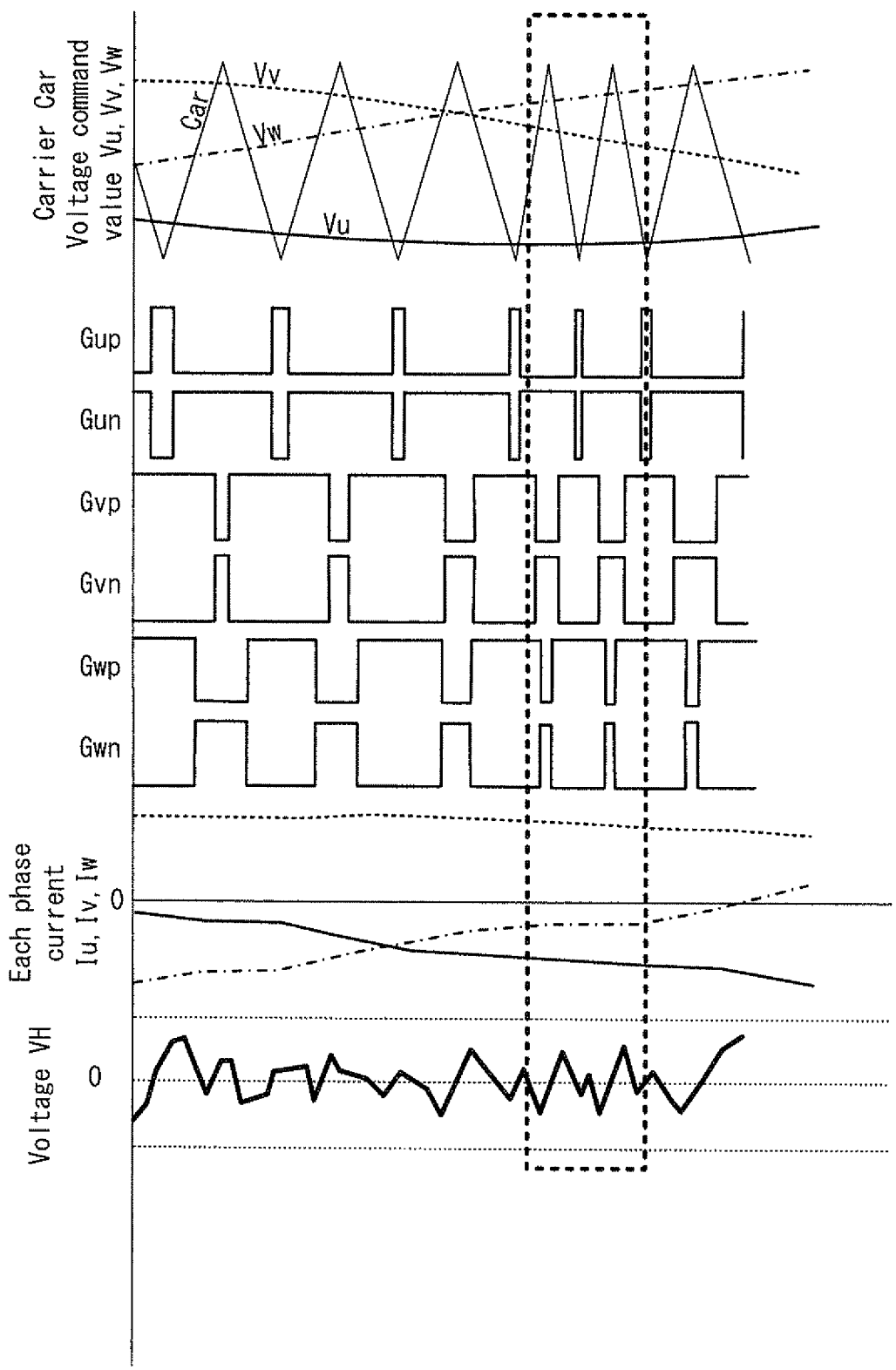
FIG. 20 is a view visually explaining the content of the VH peak reduction control shown in FIG. 18.

Next, the effect of the embodiment will be explained with reference to FIG. 20. FIG. 20 is another view visually explaining the content of the VH peak reduction control. Incidentally, in FIG. 20, portions overlapping those of FIG. 12 will carry the same reference numerals, and the explanation thereof will be omitted as occasion demands.

In FIG. 20, an illustrated dashed frame indicates an area in which the carrier frequency fear is set higher.

Here, as already explained, the switching state of each switching element of the inverter 300 is determined by a magnitude relation between each phase voltage command value and the carrier Car. Therefore, if the comparison is performed using the same value for each phase voltage command value, a switching pulse width is shorten with an increase in the carrier frequency fear. The shorter switching pulse width causes a reduction in time in which the inter-terminal voltage VH of the smoothing condenser C increases, resulting in the low VH peak.

Moreover, according to the embodiment, since the VH peak can be suppressed despite the action of the second power converter (the boost converter 200 and the inverter 400), the system configuration can be simplified, which is efficient.

Fifth Embodiment

Next, a fifth embodiment of the present invention will be explained.

Figure 21:
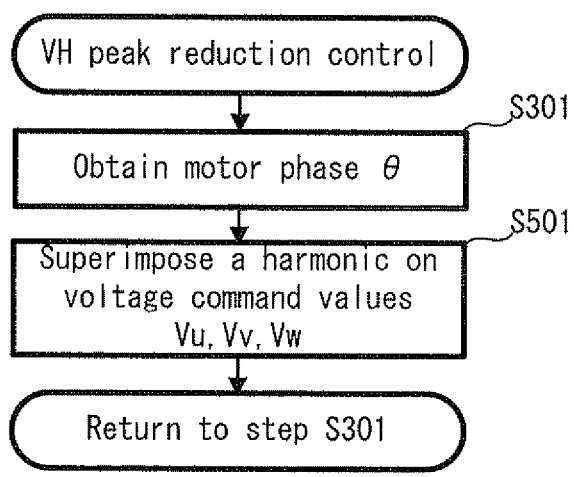
FIG. 21 is a flowchart showing VH peak reduction control in a fifth embodiment.

Firstly, with reference to FIG. 21, VH peak reduction control in the fifth embodiment will be explained. FIG. 21 is a flowchart showing the VH peak reduction control in the fifth embodiment. Incidentally, in FIG. 21, portions overlapping those of FIG. 15 will carry the same reference numerals, and the explanation thereof will be omitted as occasion demands.

In FIG. 21, if obtaining the motor phase θ (the step S301), the control apparatus 100 superimposes a harmonic Har on each of the command values in the three phases Vu, Vv and Vw (step S501). The VH peak reduction control in the fifth embodiment is performed in the above manner.

The superimposition of the harmonic Har in the step S501 is performed on an inverter control unit 140 of the control apparatus 100. The inverter control unit 140 is obtained by adding a harmonic generation unit 141 and adder-subtractors 142 to the inverter control unit 120.

Figure 22:
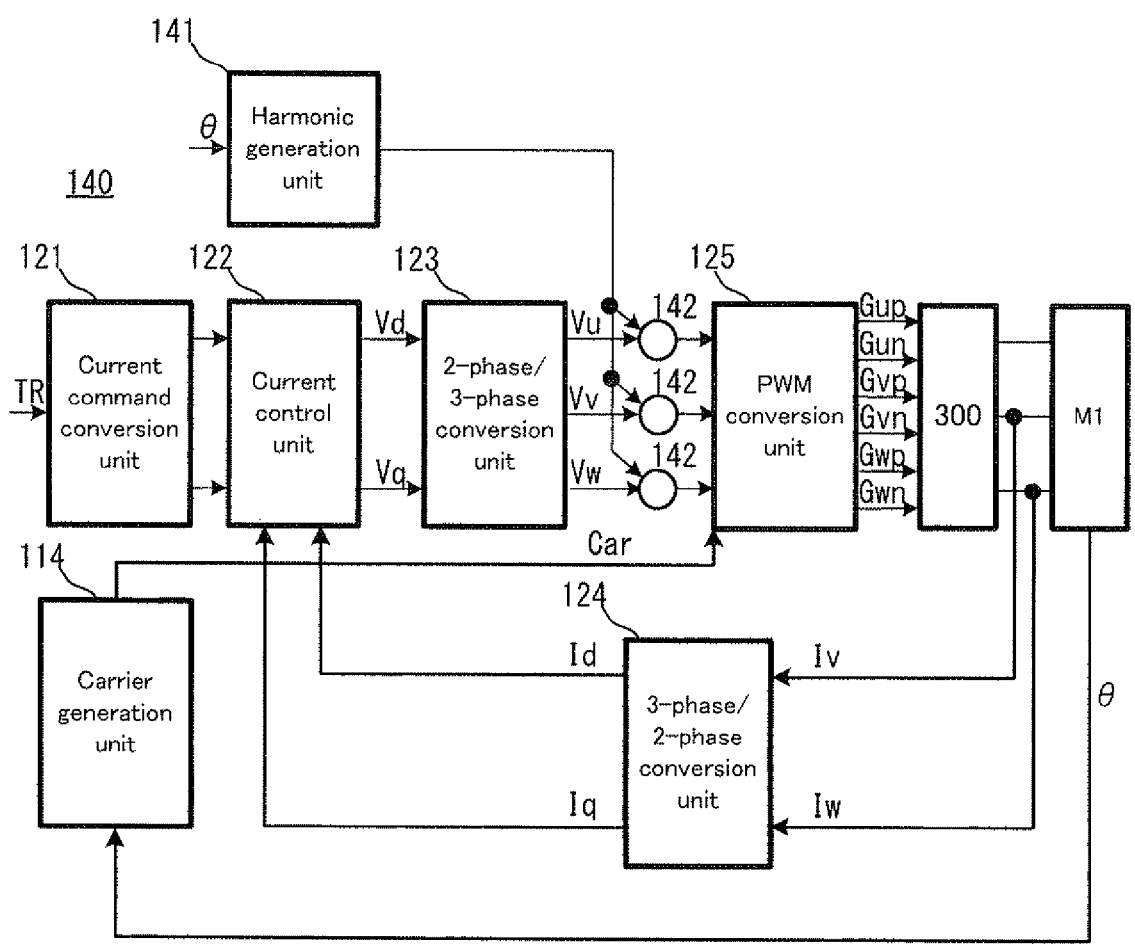
FIG. 22 is a block diagram showing an inverter control unit in the fifth embodiment.

Now, with reference to FIG. 22, the inverter control unit 140 will be explained. FIG. 22 is a block diagram showing the inverter control unit 140. Incidentally, in FIG. 22, portions overlapping those of FIG. 4 will carry the same reference numerals, and the explanation thereof will be omitted as occasion demands.

Figure 23:
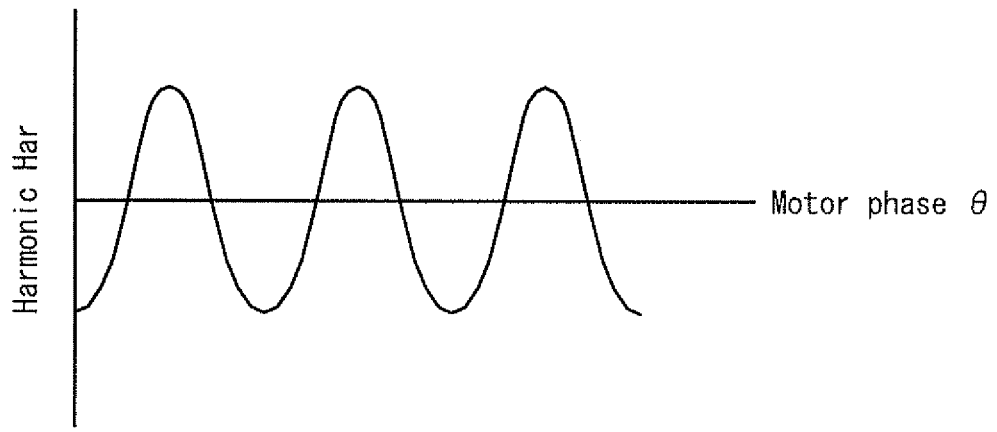
FIG. 23 is a conceptual diagram showing a harmonic in the VH peak reduction control shown in FIG. 21.

In FIG. 22, the harmonic generation unit 140 generates the harmonic Har (e.g. third harmonic) from the waveform of each phase voltage command value and supplies it to each of the adder-subtractors 142. Now, with reference to FIG. 23, the harmonic Har generated on the harmonic generation unit 140 will be explained. FIG. 23 is a view showing a relation between the harmonic and the motor phase θ.

In FIG. 23, the harmonic Har is the third harmonic of each phase voltage command value. The harmonic Har as described above is superimposed on the waveform of each phase voltage command as a fundamental wave.

Back in FIG. 22, each of the adder-subtractors 142 is provided between the two-phase/three-phase conversion unit 123 and the PWM conversion unit 125 for respective one of the three phases and superimposes the harmonic generated for each of the voltage command values Vu, Vv and Vw corresponding to the three phases outputted from the two-phase/three-phase conversion unit 123.

Figure 24:
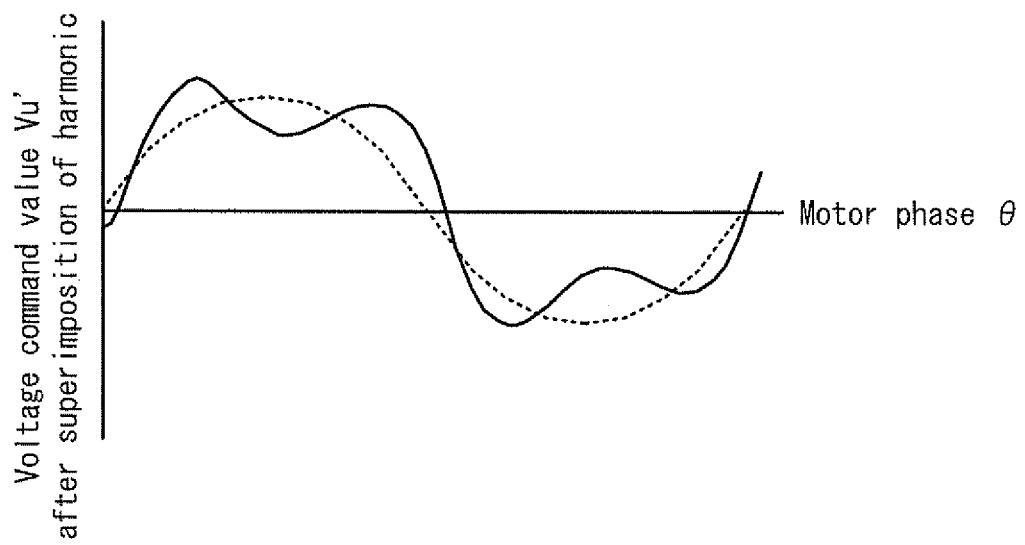
FIG. 24 is a conceptual diagram showing a command voltage after superimposition in which the harmonic shown in FIG. 23 and a command voltage are superimposed.

FIG. 24 shows each phase voltage command value after the superimposition of the harmonic. FIG. 24 is a conceptual diagram showing the voltage command value after the superimposition of the harmonic.

In FIG. 24, in contrast to the fundamental wave shown by a dashed line (the voltage command value before the superimposition), the voltage command value after the superimposition of the harmonic is shown by a solid line. As shown in the drawing, if the harmonic is superimposed on the fundamental wave, the waveform becomes distorted. As a result, the magnitude relation with the carrier Car changes, and the switching timing of the switching elements in each phase also changes.

Here, in particular, the harmonic generation unit 141 is configured to generate the harmonic to be superimposed on each phase voltage command value such that the switching pulse width is narrowed in a portion in which the VH peak increases. The suppression of the increase in the inter-terminal voltage VH due to the narrowed switching pulse width results in the suppression of the VH peak.

Incidentally, in order to realize the effective suppression of the VH peak due to the harmonic, a correlation between the motor phase θ and amplitude of the harmonic Har is important. The correlation is obtained experimentally, experientially, or theoretically in advance so as to avoid the switching of the switching element in timing in which the VH peak increases, and the correlation is control-mapped and stored in the ROM.

The present invention is not limited to the aforementioned embodiments, but various changes may be made, if desired, without departing from the essence or spirit of the invention which can be read from the claims and the entire specification. A motor drive system, which involves such changes, is also intended to be within the technical scope of the present invention.

INDUSTRIAL APPLICABILITY

The present invention can be applied to drive control of an alternating current motor.

DESCRIPTION OF REFERENCE CODES

10 motor drive system
100 control apparatus
110 boost converter control unit
120 inverter control unit
200 boost converter
300 inverter
C smoothing condenser
B direct current power supply
M three-phase alternating current motor

The invention claimed is:

1. A motor drive system control apparatus for controlling a motor drive system comprising:
 a direct current power supply;
 a three-phase alternating current motor; and
 a first power converter disposed between the direct current power supply and the three-phase alternating current motor and including switching circuits corresponding to each of three phases of the three-phase alternating current motor and a smoothing condenser disposed electrically in parallel with the switching circuits, said motor drive system control apparatus comprising:
  an estimating device for estimating peak generation timing in which a peak is generated in an inter-terminal voltage VH of the smoothing condenser on the basis of at least one of an operating condition of the three-phase alternating current motor including at least one of an electric current corresponding to each of the three phases and a phase of the three-phase alternating current motor and a switching condition of the switching circuits corresponding to each of the three phases; and
  a controlling device for controlling a drive condition of the first power converter such that the inter-terminal voltage VH (or a VH peak) in the peak generation timing decreases, for a predetermined period from start timing set in a time domain before the estimated peak generation timing,
 wherein said estimating device estimates the peak generation timing on the basis of polarity of an electric current corresponding to each of the three phases and switching timing of the switching circuits corresponding to each of the three phases.

2. The motor drive system control apparatus according to claim 1, wherein
the switching timing is timing in which a carrier voltage value matches a command voltage value, and
said estimating device estimates (1) first timing in which the electric current is positive and in which the carrier voltage value matches the command voltage value when the command voltage value goes beyond the carrier voltage value and (2) second timing in which the electric current is negative and in which the carrier voltage value matches the command voltage value when the command voltage value falls under the carrier voltage value, as the peak generation timing for each of the three phases.

3. The motor drive system control apparatus according to claim 1, wherein said estimating device estimates the peak generation timing on the basis of a phase of the three-phase alternating current motor.

4. The motor drive system control apparatus according to claim 1, wherein
the motor drive system comprises a second power converter, and
said controlling device changes a drive condition of the second power converter as one aspect of controlling the drive condition of the first power converter.

5. The motor drive system control apparatus according to claim 4, wherein
the second power converter is disposed on a side closer to the direct current power supply than the smoothing condenser and includes a booster circuit capable of boosting a direct current voltage of the direct current power supply and capable of maintaining the inter-terminal voltage VH at a predetermined VH command value, and
said controlling device reduces the VH command value.

6. The motor drive system control apparatus according to claim 1, wherein
the switching circuits corresponding to each of the three phases are configured to change a switching state in accordance with a magnitude relation between a carrier voltage value and a command voltage value, and
said controlling device reduces the VH peak by changing a frequency of a carrier signal to a high frequency side.

7. The motor drive system control apparatus according to claim 1, wherein
the switching circuits corresponding to each of the three phases are configured to change a switching state in accordance with a magnitude relation between a carrier voltage value and a command voltage value, and
said controlling device superimposes a predetermined harmonic on the command voltage value.

\* \* \* \* \*